(12) United States Patent  
Totsuka et al.

(10) Patent No.: US 7,218,861 B2  
(45) Date of Patent: May 15, 2007

(54) OPTICAL TRANSCEIVER, A MULTIPLEXING INTEGRATED CIRCUIT, A DEMULTIPLEXING INTEGRATED CIRCUIT, AN INTEGRAL MULTIPLEXING/DEMULTIPLEXING INTEGRATED CIRCUIT, AND METHOD FOR EVALUATING AND TESTING THE OPTICAL TRANSCEIVER

(75) Inventors: Hirofumi Totsuka, Tokyo (JP); Kazuo Kubo, Tokyo (JP); Kuniaki Motoshima, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 1257 days.

(21) Appl. No.: 10/081,234

(22) Filed: Feb. 25, 2002

(65) Prior Publication Data

US 2003/0043752 A1    Mar. 6, 2003

(30) Foreign Application Priority Data

Aug. 31, 2001   (JP) .............................. 2001-264376

(51) Int. Cl.  
*H04B 10/00* (2006.01)

(52) U.S. Cl. ..................................... 398/135; 398/140

(58) Field of Classification Search ................ 398/135, 398/137–140, 162; 375/221, 224; 714/707, 714/704  
See application file for complete search history.

(56) References Cited

U.S. PATENT DOCUMENTS 4,926,425 A    5/1990   Hedtke et al.

5,392,289 A * 2/1995 Varian ........................ 714/707  
5,787,114 A * 7/1998 Ramamurthy et al. ...... 375/221  
5,802,073 A * 9/1998 Platt ........................... 714/733

FOREIGN PATENT DOCUMENTS

| JP | 4-326821 | 11/1992 |
| JP | 4-331520 | 11/1992 |
| JP | 5-218909 | 8/1993 |
| JP | 6-54034 | 2/1994 |
| JP | 8-97774 | 4/1996 |
| JP | 8-265620 | 10/1996 |

OTHER PUBLICATIONS

N. Mukherjee et al. "Built-in self-test: a complete test solution for telecommunication systems"; IEEE Communications Magazine, Jun. 1999, pp. 72-78.*

(Continued)

*Primary Examiner*—Jason Chan  
*Assistant Examiner*—Quan-Zhen Wang  
(74) *Attorney, Agent, or Firm*—Buchanan Ingersoll & Rooney PC

(57) ABSTRACT

An optical transceiver 1 comprises first and second pseudo-random pattern generators 23 and 28 for generating a pseudo-random pattern signal, which are placed in a transmitting side path 6 and in a receiving side path 11 of the optical transceiver 1, respectively; first and second pseudo-random pattern detectors 21 and 26 for evaluating an inputted pseudo-random pattern signal, which are placed in the transmitting side path 6 and in the receiving side path 11 of the optical transceiver 1, respectively; a first loopback path 31 that loops back from a multiplexing circuit 3 to a demultiplexing circuit 8; and a second loopback path 32 that loops back from a light-electricity converter 7 to an electricity-light converter 4.

16 Claims, 15 Drawing Sheets

OTHER PUBLICATIONS

Takemi Suzuki et al, "2.5 Gbit/s Fiber-Optic Transceiver with MUX/DEMUX and Operating at Single 3.3 V Power Supply", Proceedings ofIEICE Electronics Society, 1998, p. 392, B-10-70, The Institute of Electronics, Information and Communication Engineers (IEICE), Tokyo, Japan.

Japanese Office Action dated Aug. 1, 2006.

N. Mukherjee, et al., "Built-In Self-Test: A Complete Test Solution for Telecommunication Systems", IEEE Communications Magazine, vol. 37, No. 6, Jun. 1999, pp. 72-78.

M. Gagnon, et al., "Optical Communication Channel Test Using Bist Approaches", Proceedings of the International Test Conference, ITC 1997, IEEE, vol. Conf. 28, Nov. 1, 1997, pp. 626-635.

* cited by examiner

FRAME PATTERN (AT THE TIME OF EVALUATION AND TESTING): OVERHEAD | PN PATTERN

FRAME PATTERN (AT THE TIME OF NORMAL OPERATION): OVERHEAD | DATA

OPTICAL TRANSCEIVER, A MULTIPLEXING INTEGRATED CIRCUIT, A DEMULTIPLEXING INTEGRATED CIRCUIT, AN INTEGRAL MULTIPLEXING/DEMULTIPLEXING INTEGRATED CIRCUIT, AND METHOD FOR EVALUATING AND TESTING THE OPTICAL TRANSCEIVER

BACKGROUND OF THE INVENTION

1. Field of the Invention

The present invention relates to an optical transceiver that time-multiplexes an inputted electric signal, converts the electric signal into a light signal, and output the converted signal, and that converts an input light signal into an electric signal, demultiplexes the light signal, and output the demultiplexes signal. In addition, the invention relates to a multiplexing integrated circuit, a demultiplexing integrated circuit, an integral multiplexing/demultiplexing integrated circuit, which are used for the optical transceiver, and a method for evaluating and testing the optical transceiver.

2. Description of Related Art

FIG. 19 is a block diagram illustrating a configuration of a typical high-speed optical transmitter-receiver (hereinafter referred to just as a "transceiver"), which is shown in, for example, a document, "MUX/DEMUX built-in 3.3V operation 2.5 Gbit/s optical transceiver" by Suzuki, and others, 1998, The Institute of Electronics, Information and Communication Engineers, Society meeting, preprints B-10-70, P392. In FIG. 19, a reference numeral 1 denotes an optical transceiver; 2 denotes a low-speed parallel input interface (I/F) for receiving a parallel data signal inputted from outside of the optical transceiver 1; 3, a multiplexing circuit (MUX) for time-multiplexing the parallel data signal inputted to the optical transceiver 1; 4, an electricity-light converter (E/O) for converting an output electric signal of the multiplexing circuit 3 into a light signal; 5, a transmitting unit comprising the multiplexing circuit 3 and the electricity-light converter 4; 6, a transmitting side path (TX) comprising the low-speed parallel input interface 2 and the transmitting unit 5.

In addition, in FIG. 19, reference numeral 7 denotes a light-electricity converter (O/E) for converting a light signal, which is inputted from outside, into an electric signal; 8 denotes a demultiplexing circuit (DEMUX) for demultiplexing an output signal of the light-electricity converter 7; 9, a receiving unit comprising the light-electricity converter 7 and the demultiplexing circuit 8; 10, a low-speed parallel output interface (I/F) for outputting an output parallel signal of the demultiplexing circuit 8 to outside; 11, a receiving side path (RX) comprising the low-speed parallel output interface 10 and the receiving unit 9.

FIGS. 20, 21, and 22 are diagrams illustrating first, second, and third methods for evaluating and testing the optical transceiver 1 respectively. However, components inside the optical transceiver 1 are omitted. In FIGS. 20, 21, and 22, reference numeral 12 denotes an optical transceiver implemented substrate on which the optical transceiver 1 is placed; 13 denotes input electric wiring on the optical transceiver implemented substrate 12, which is used for inputting a parallel electric signal from outside to the low-speed parallel input interface 2 of the optical transceiver 1; 14 denotes output electric wiring on the optical transceiver implemented substrate 12, which is used for outputting an output parallel signal from the optical transceiver 1 to outside of the optical transceiver implemented substrate 12.

In addition, in FIGS. 20, 21, and 22, reference numeral 15 denotes a first optical fiber for outputting a light signal from the transmitting unit 5; 16 denotes a second optical fiber for inputting a light signal to the receiving unit 9; 17, a light measuring instrument that has a pseudo-random pattern generating function (PN_G) and a pseudo-random pattern detecting function (PN_C); 18, an electric measuring instrument that has a pseudo-random pattern generating function (PN_G) and a pseudo-random pattern detecting function (PN_C); 19, a loopback optical fiber that loops back a light signal, which is output from the transmitting unit 5, to the receiving unit 9; 20, a loopback electric wiring on the optical transceiver implemented substrate 12, which is used for looping back an output signal of the low-speed parallel output interface 10 to the low-speed parallel input interface 2.

Next, operation will be described.

In the first place, operation of the optical transceiver 1 will be described with reference to FIG. 19. A first parallel electric signal from outside is inputted to the optical transceiver 1 through the low-speed parallel input interface 2. The multiplexing circuit 3 time-multiplexes the inputted parallel electric signal to generate a first high-speed serial signal. The electricity-light converter 4 converts the first high-speed serial signal into a light signal, which is output to outside.

A high-speed serial light signal, which is inputted from outside, is converted into a second high-speed serial electric signal in the light-electricity converter 7. The demultiplexing circuit 8 segregates the second high-speed serial electric signal by time to generate a second low-speed parallel signal. The second low speed parallel signal is output to outside of the optical transceiver 1 through the low-speed parallel output interface 10.

Next, a first method for evaluation and testing shown in FIG. 20 will be described. A first pseudo-random pattern signal (hereinafter referred to as PN pattern signal), which is generated by the PN_G of the electric measuring instrument 18, is inputted to the optical transceiver 1 through the input electric wiring 13. After the PN pattern signal is converted into a light signal by the transmitting unit 5, the PN pattern signal is inputted to the light measuring instrument 17 through the first optical fiber 15. Evaluation and testing as to whether or not malfunction has occurred in the transmitting side path 6 is performed by checking whether or not there is an error of the first PN pattern signal, which has been inputted from the optical transceiver 1, using the PN_C of the light measuring instrument 17.

In a similar manner, the second PN pattern signal, which is generated by the PN_G of the light measuring instrument 17, is inputted to the optical transceiver 1 through the second optical fiber 16. After the second PN pattern signal is converted into an electric signal by the receiving unit 9, the second PN pattern signal is inputted to the electric measuring instrument 18 through the output electric wiring 14. Evaluation and testing as to whether or not malfunction has occurred in the receiving side path 11 is performed by checking whether or not there is an error of the second PN pattern signal, which has been inputted from the optical transceiver 1, using the PN_C of the electric measuring instrument 18.

Next, a second method for evaluation and testing shown in FIG. 21 will be described. A PN pattern signal, which is generated by the PN_G of the electric measuring instrument 18, is inputted to the optical transceiver 1 through the input electric wiring 13. Then, the PN pattern signal is converted into a light signal in the transmitting unit 5, and is output. This light signal is inputted to the receiving unit 9 through the loopback optical fiber 19. After the light signal is converted into an electric signal, the electric signal is inputted to the electric measuring instrument 18 through the output electric wiring 14. Evaluation and testing of malfunction, which cover both of the transmitting side path 6 and the receiving side path 11 of the optical transceiver 1 (that is to say, the whole optical transceiver 1 including the optical fiber path and the optical transceiver implemented substrate 12), are performed at a time by checking whether or not there is an error of the inputted PN pattern signal using the PN_C of the electric measuring instrument 18.

Next, a third method for evaluation and testing shown in FIG. 22 will be described. A PN pattern signal, which is generated by the PN_G of the light measuring instrument 17, is inputted to the optical transceiver 1 through the second optical fiber 16. Then, the PN pattern signal is converted into an electric signal in the receiving unit 9. The electric signal is inputted to the low-speed parallel input interface 2 through the loopback electric wiring 20. After the electric signal is converted into a light signal in transmitting unit 5, the light signal is inputted to the light measuring instrument 17 through the first optical fiber 15. Evaluation and testing of malfunction, which cover both of the receiving side path 11 and the transmitting side path 6 (that is to say, the whole optical transceiver 1 including an evaluation/test system and the optical transceiver implemented substrate 12), are performed at a time by checking whether or not there is an error of the inputted PN pattern signal using the PN_C of the light measuring instrument 17.

Because the conventional optical transceiver, and the method for evaluating and testing the conventional optical transceiver, were devised and embodied as described above, there was the following problem: although it is possible to evaluate and test the whole transmitting side path 6, the whole receiving side path 11, or the whole optical transceiver 1 as a whole, it is not possible to identify a path in the optical transceiver implemented substrate 12 and the optical transceiver 1 if malfunction occurs.

In addition, the conventional method for evaluation and testing produced the following problem: one or two measuring instruments, such as the light measuring instrument 17 and the electric measuring instrument 18, are used, which causes the evaluation/test system to become large.

SUMMARY OF THE INVENTION

In view of the foregoing, the present invention has been made, and an object of the present invention is to provide an optical transceiver, a multiplexing integrated circuit, a demultiplexing integrated circuit, an integral multiplexing/demultiplexing integrated circuit, and a method for evaluating and testing the optical transceiver, by which, if malfunction occurs, a path where the malfunction has occurred can be identified.

Another object of the present invention is to provide a method for evaluating and testing an optical transceiver capable of downsizing an evaluation/test system and simplifying evaluation and testing.

An optical transceiver according to the present invention comprises the following: a first pseudo-random pattern generator and a first pseudo-random pattern detector in a transmitting side path; a second pseudo-random pattern generator and a second pseudo-random pattern detector in a receiving side path; a first loopback path that transmits a pseudo-random pattern signal from the transmitting side path to the receiving side path; and a second loopback path that transmits a pseudo-random pattern signal from the receiving side path to the transmitting side path.

The optical transceiver according to the present invention comprises the following: a first selector in the transmitting side path, which selects an electric signal from an input interface or a pseudo-random pattern signal from the first pseudo-random pattern generator, and which outputs the electric signal or the pseudo-random pattern signal to the first pseudo-random pattern detector; and a second selector in the receiving side path, which selects an electric signal from a demultiplexing circuit or a pseudo-random pattern signal from the second pseudo-random pattern generator, and which outputs the electric signal or the pseudo-random pattern signal to the second pseudo-random pattern detector.

The optical transceiver according to the present invention comprises the following: the first selector in the transmitting side path, which selects an electric signal from the input interface or a pseudo-random pattern signal from the first pseudo-random pattern generator; the third selector in the transmitting side path, which selects the electric signal from the input interface or an output of the first selector, and which outputs the electric signal or the output of the first selector to the first pseudo-random pattern detector; the second selector in the receiving side, which selects an electric signal from the demultiplexing circuit or a pseudo-random pattern signal from the second pseudo-random pattern generator; and the fourth selector in the receiving side, which selects the electric signal from the demultiplexing circuit or an output of the second selector, and which outputs the electric signal or the output of the second selector to the second pseudo-random pattern detector.

The optical transceiver according to the present invention comprises the following: a first integral pseudo-random pattern generator/detector that is configured as one circuit comprising the first pseudo-random pattern generator and the first pseudo-random pattern detector; and a second integral pseudo-random pattern generator/detector that is configured as one circuit comprising the second pseudo-random pattern generator and the second pseudo-random pattern detector.

The optical transceiver according to the present invention is characterized by the following: the first and the second integral pseudo-random pattern generators/detectors input a pseudo-random pattern signal, which has been inputted, as an initial value to generate a pseudo-random pattern signal for error detection and comparison; pseudo-random pattern detection is performed by comparing the generated pseudo-random pattern signal for error detection and comparison with the inputted pseudo-random pattern signal; pseudo-random pattern generation is performed by generating a pseudo-random pattern signal using a given initialization signal, or by generating the pseudo-random pattern signal by inputting the inputted pseudo-random pattern signal as an initial value.

The optical transceiver according to the present invention is characterized by the following: the input interface, the first pseudo-random pattern generator, the first pseudo-random pattern detector, and the multiplexing circuit are integrated into the multiplexing integrated circuit; and the demultiplexing circuit, the second pseudo-random pattern generator, the second pseudo-random pattern detector, and the output interface are integrated into the demultiplexing integrated circuit.

The optical transceiver according to the present invention is characterized by the following: the input interface, the first pseudo-random pattern generator, the first pseudo-random pattern detector, the multiplexing circuit, the demultiplexing circuit, the second pseudo-random pattern generator, the second pseudo-random pattern detector, the output interface, and the first loopback path are integrated into one unit to constitute the integral multiplexing/demultiplexing integrated circuit.

A multiplexing integrated circuit according to the present invention comprises the input interface, the multiplexing circuit, the pseudo-random pattern generator, and the pseudo-random pattern detector.

The multiplexing integrated circuit according to the present invention is an integral pseudo-random pattern generator/detector that is configured as one circuit comprising the pseudo-random pattern generator and the pseudo-random pattern detector.

A demultiplexing integrated circuit according to the present invention comprises the demultiplexing circuit, the output interface, the pseudo-random pattern generator, and the pseudo-random pattern detector.

The demultiplexing integrated circuit according to the present invention is an integral pseudo-random pattern generator/detector that is configured as one circuit comprising the pseudo-random pattern generator and the pseudo-random pattern detector.

An integral multiplexing/demultiplexing integrated circuit according to the present invention comprises the following: a multiplexing portion comprising the input interface, the multiplexing circuit, the first pseudo-random pattern generator, and the first pseudo-random pattern detector; the demultiplexing portion comprising the demultiplexing circuit, the output interface, the second pseudo-random pattern generator, and the second pseudo-random pattern detector; and the loopback path that transmits the pseudo-random pattern signal from the multiplexing circuit to the demultiplexing circuit.

The integral multiplexing/demultiplexing integrated circuit according to the present invention comprises the following: a first integral pseudo-random pattern generator/detector that is configured as one circuit comprising the first pseudo-random pattern generator and the first pseudo-random pattern detector; and a second integral pseudo-random pattern generator/detector that is configured as one circuit comprising the second pseudo-random pattern generator and the second pseudo-random pattern detector.

A method for evaluating and testing an optical transceiver according to the present invention, the optical transceiver comprising:

a transmitting side path including an input interface, a first pseudo-random pattern generator, a first pseudo-random pattern detector, a multiplexing circuit, and an electricity-light converter;

a receiving side path including a light-electricity converter, a demultiplexing circuit, a second pseudo-random pattern generator, a second pseudo-random pattern detector, and an output interface;

a first loopback path, which transmits a pseudo-random pattern signal from the multiplexing circuit of the transmitting side path to the demultiplexing circuit of the receiving side path; and a second loopback path, which transmitted a pseudo-random pattern signal from the receiving side path to the transmitting side path;

wherein:

the optical transceiver is placed on an implementation substrate;

a loopback electric wiring is placed on the implementation substrate so as to loop back from an output electric wiring on the implementation substrate, which is connected to an output interface, to an input electric wiring on the implementation substrate, which is connected to an input interface;

an output of an electricity-light converter is connected to an outside pseudo-random pattern detecting function through a first optical fiber; and an input of a light-electricity converter is connected to an outside pseudo-random pattern generating function through a second optical fiber.

The method for evaluating and testing an optical transceiver according to the present invention uses a light measuring instrument as an outside pseudo-random pattern detecting function and an outside pseudo-random pattern generating function.

The method for evaluating and testing an optical transceiver according to the present invention uses another optical transceiver, which works normally, as an outside pseudo-random pattern detecting function and an outside pseudo-random pattern generating function.

A method for evaluating and testing an optical transceiver according to the present invention, the optical transceiver comprising:

a transmitting side path including an input interface, a first pseudo-random pattern generator, a first pseudo-random pattern detector, a multiplexing circuit, and an electricity-light converter;

a receiving side path including a light-electricity converter, a demultiplexing circuit, a second pseudo-random pattern generator, a second pseudo-random pattern detector, and an output interface; and a loopback path, which transmitted a pseudo-random pattern signal from the transmitting side path to the receiving side path;

wherein:

the optical transceiver is placed on an implementation substrate;

a loopback electric wiring is placed on the implementation substrate so as to loop back from an output electric wiring on the implementation substrate, which is connected to an output interface, to an input electric wiring on the implementation substrate, which is connected to an input interface;

a loopback optical fiber, which is used for transmitting a pseudo-random pattern signal from a first optical fiber connected to an output of an electricity-light converter to a second optical fiber connected to an input of a light-electricity converter, is connected;

the input electric wiring on the implementation substrate is connected to an outside pseudo-random pattern generating function; and the output electric wiring on the implementation substrate is connected to an outside pseudo-random pattern detecting function.

The method for evaluating and testing an optical transceiver according to the present invention uses an electric measuring instrument as an outside pseudo-random pattern detecting function and an outside pseudo-random pattern generating function.

The method for evaluating and testing an optical transceiver according to the present invention uses another optical transceiver, which works normally, as an outside pseudo-random pattern detecting function and an outside pseudo-random pattern generating function.

A method for evaluating and testing an optical transceiver according to the present invention, the optical transceiver comprising:

a transmitting side path comprising an input interface, a first pseudo-random pattern generator, a first pseudo-random pattern detector, a multiplexing circuit, and an electricity-light converter;

a receiving side path comprising a light-electricity converter, a demultiplexing circuit, a second pseudo-random pattern generator, a second pseudo-random pattern detector, and an output interface; and a loopback path, which transmitted a pseudo-random pattern signal from the transmitting side path to the receiving side path;

wherein:

the optical transceiver is placed on an implementation substrate;

a loopback electric wiring is placed on the implementation substrate so as to loop back from an output electric wiring on the implementation substrate, which is connected to an output interface, to an input electric wiring on the implementation substrate, which is connected to an input interface; and a loopback optical fiber, which is used for transmitting a pseudo-random pattern signal from a first optical fiber connected to an output of an electricity-light converter to a second optical fiber connected to an input of a light-electricity converter, is connected.

The method for evaluating and testing an optical transceiver according to the present invention is characterized by the following: a pseudo-random pattern generating function of a framer circuit, which generates and transmits/receives a frame pattern, is connected to an input electric wiring; and a pseudo-random pattern detecting function of the framer circuit is connected to an output electric wiring.

The method for evaluating and testing an optical transceiver according to the present invention is characterized in that a framer circuit builds a pseudo-random pattern signal into a frame pattern to transmit the pseudo-random pattern signal.

DETAILED DESCRIPTION OF THE PREFERRED EMBODIMENTS

Preferred embodiments of the present invention will be described as below.

(First Embodiment)

Figure 1:
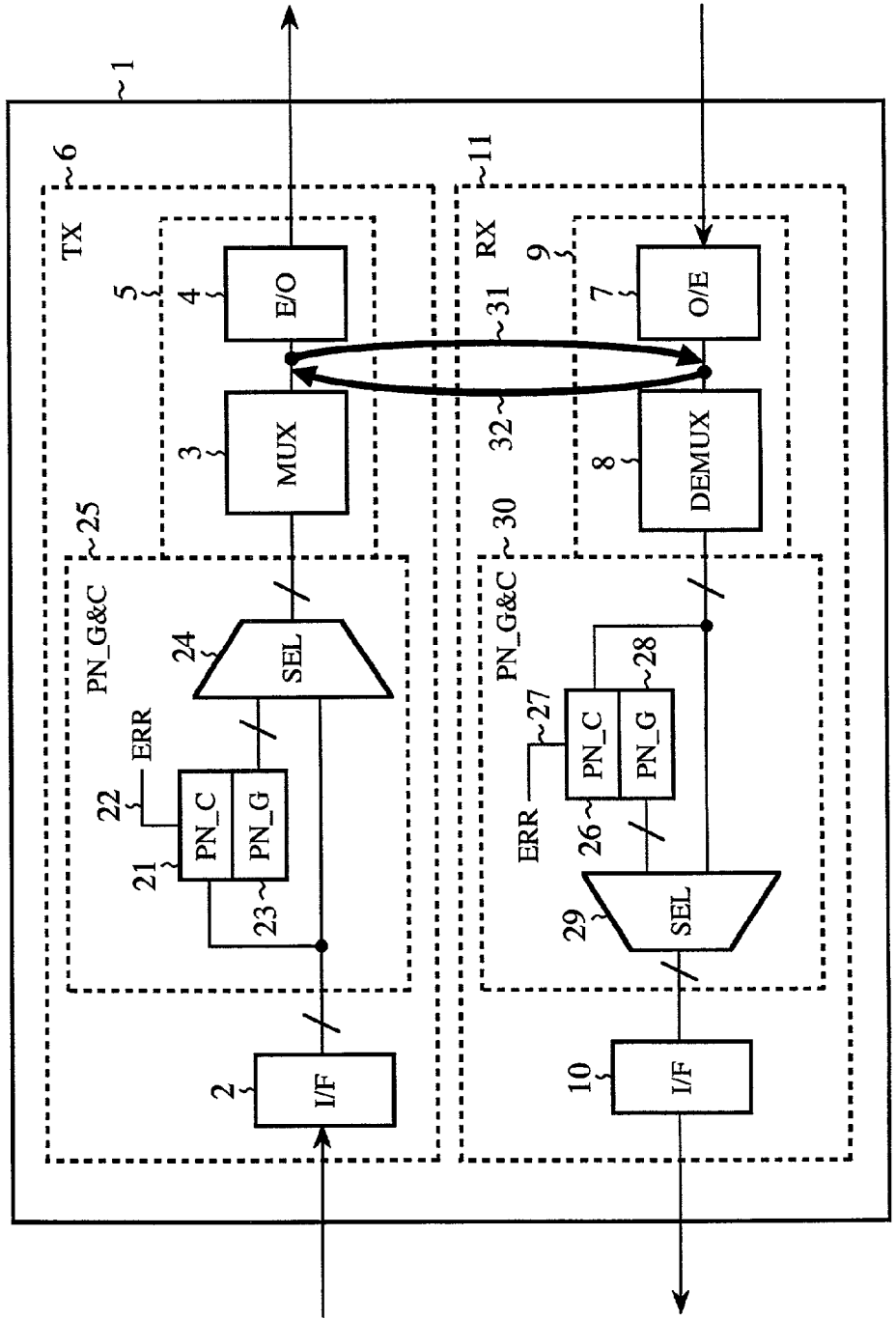
FIG. 1 is a block diagram illustrating a configuration of an optical transceiver according to a first embodiment of the present invention.

FIG. 1 is a block diagram illustrating a configuration of an optical transceiver according to a first embodiment of the present invention. In the figure, the same or like parts are denoted by the same reference numerals in FIG. 19 and the duplicate description thereof will be omitted. In FIG. 1, reference numeral 21 denotes a first pseudo-random pattern detector (PN_C); 22 denotes a first error output of the first pseudo-random pattern detector 21; 23, a first pseudo-random pattern generator (PN_G); 24, first selector (SEL)

for selecting an output signal of the first pseudo-random pattern generator 23 or an output of a low-speed parallel input interface 2; and 25, a first pseudo-random pattern generator/detector (PN_G&C) comprising the first pseudo-random pattern detector 21, the first error output 22, the first pseudo-random pattern generator 23, and the first selector 24.

Moreover, in FIG. 1, reference numeral 26 denotes a second pseudo-random pattern detector (PN_C); 27 denotes a second error output of the second pseudo-random pattern detector 26; 28, a second pseudo-random pattern generator (PN_G); 29, a second selector (SEL) for selecting an output signal of the second pseudo-random pattern generator 28 or an output of a demultiplexing circuit 8; and 30, a second pseudo-random pattern generator/detector (PN_G&C) comprising the second pseudo-random pattern detector 26, the second error output 27, the second pseudo-random pattern generator 28, and the second selector 29.

In addition, in FIG. 1, reference numeral 31 denotes a first loopback path that loops back a high-speed serial signal directly from the multiplexing circuit 3 to the demultiplexing circuit 8; and 32 denotes a second loopback path that loops back a high-speed serial signal directly from a light-electricity converter 7 to an electricity-light converter 4. The first loopback path 31 and the second loopback path 32 are always connected to each other. A traveling direction of a signal is determined by a signal switching device (not illustrated) such as a selector at the time of normal operation and at the time of evaluation and testing. In this case, the first loopback path 31 and the second loopback path 32 can be used as the second loopback path 32 and the first loopback path 31 respectively. In addition, the first loopback path 31 can also be directly connected from the multiplexing circuit 3 to the demultiplexing circuit 8; and the second loopback path 32 can also be directly connected from the demultiplexing circuit 8 to the multiplexing circuit 3.

Next, operation will be described.

When evaluating and testing operation of the low-speed parallel input interface 2, a PN pattern signal is inputted from an electric measuring instrument, etc. to the low-speed parallel input interface 2, and then the inputted PN pattern signal is evaluated by the first pseudo-random pattern detector 21. If an error is detected in the PN pattern signal, a signal is output from the first error output 22.

In addition, when evaluating and testing a transmitting unit 5, the first pseudo-random pattern generator 23 generates a PN pattern signal. An output of the first pseudo-random pattern generator 23 is selected by the first selector 24, and the PN pattern signal is inputted to the transmitting unit 5. Then, the PN pattern signal, which has been converted into a light signal, is evaluated using a pseudo-random pattern detecting function of a light measuring instrument, etc.

Moreover, when evaluating the whole transmission side path 6, a PN pattern signal is inputted from the electric measuring instrument, etc. to the low-speed parallel input interface 2. After that, the first selector 24 selects an output signal of the low-speed parallel input interface 2, and inputs the PN pattern signal to the transmitting unit 5. Then, the PN pattern signal converted into a light signal, which is output from the transmitting unit 5, is evaluated using the light measuring instrument.

Furthermore, when evaluating and testing a receiving unit 9 of a receiving side path 11, the PN pattern signal, which has been inputted from the light measuring instrument, is evaluated by the second pseudo-random pattern detector 26. If an error is detected in the PN pattern signal, a signal is output from the second error output 27.

Moreover, when evaluating and testing a low-speed parallel output interface 10, the PN pattern signal, which has been generated by the second pseudo-random pattern generator 28, is output through the second selector 29 and the low-speed parallel output interface 10, and is evaluated using a pseudo-random pattern detecting function of the electric measuring instrument, etc.

Moreover, when evaluating and testing the whole receiving side path 11, the second selector 29 selects an output signal of the demultiplexing circuit 8 to input a PN pattern signal to the low-speed parallel output interface 10. Then, the PN pattern signal is evaluated using the electric measuring instrument, etc.

Moreover, when evaluating and testing the multiplexing circuit 3 and the demultiplexing circuit 8 as a whole, a PN pattern signal, which has been generated by the first pseudo-random pattern generator 23, is passed through a path (the first selector 24—the multiplexing circuit 3—the first loopback path 31—the demultiplexing circuit 8—the second pseudo-random pattern detector 26). Then, the PN pattern signal is evaluated by the second pseudo-random pattern detector 26.

In a similar manner, use of the first loopback path 31 enables the following: evaluation and testing of a path (the low-speed parallel input interface 2—the multiplexing circuit 3—the first loopback path 31—the demultiplexing circuit 8); evaluation and testing of a path (the multiplexing circuit 3—demultiplexing circuit 8—the low-speed parallel output interface 10), and evaluation and testing of a path (the low-speed parallel input interface 2—the multiplexing circuit 3—the first loopback path 31—the demultiplexing circuit 8—the low-speed parallel input interface 10).

Moreover, when evaluating and testing the electricity-light converter 4 and the light-electricity converter 7 as a whole, a PN pattern signal is inputted from the light measuring instrument to the light-electricity converter 7, and is output to the light measuring instrument, etc., through the second loopback path 32 and the electricity-light converter 4. Then, the PN pattern signal is evaluated using a pseudo-random detecting function of the light measuring instrument, etc.

In the above-mentioned evaluation and testing in which the first pseudo-random pattern generator/detector 25 is used, selecting an output of the first pseudo-random pattern generator 23 using the first selector 24 and inputting a PN signal to the first pseudo-random pattern detector 21 permit a pseudo-random pattern generating function and a pseudo-random pattern detecting function to be performed simultaneously in the first pseudo-random pattern generator/detector 25. A case of the second pseudo-random pattern generator/detector 30 is also the same.

When operating the optical transceiver 1 normally, the first selector 24 selects an output of the low-speed parallel input interface 2, inputs a normal data electric signal from the low-speed parallel input interface 2, and then passes the electric signal through the transmitting side path 6 without processing. In addition, the second selector 29 selects an output of the demultiplexing circuit 8, inputs a normal data light signal to the receiving unit 9, and then passes the light signal through the receiving side path 11 without processing.

Figure 2:
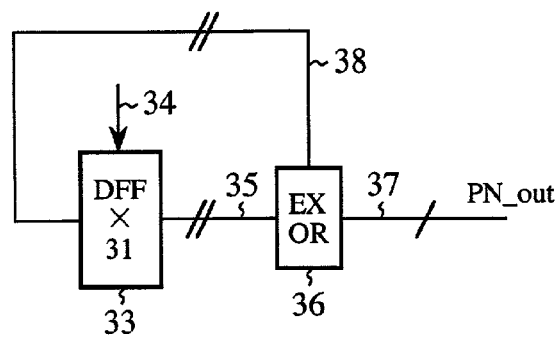
FIG. 2 is a block diagram illustrating a configuration of first and second pseudo-random pattern generators of the optical transceiver according to the first embodiment of the present invention.

FIG. 2 is a block diagram illustrating a configuration of the first and the second pseudo-random pattern generators 23 and 28. This example will be described on the assumption that a number of parallel data is 16, and that a number of PN steps is 31. In FIG. 2, reference numeral 33 denotes a first shift register in which 31 D flip-flops (DFF) are placed in parallel; 34 denotes an initialization signal for initializing the first shift register 33; 35, a first output parallel signal based on 31 parallel channels, which is output by the first shift register 33; 36, a first EXOR group in which exclusive OR gates are placed; 37, a first PN pattern output signal that has been converted into a signal based on 16 parallel channels, and that is output from the first EXOR group 36; and 38, a second PN pattern output signal that has been converted into a signal based on 31 parallel channels, and that is output from the first EXOR group 36.

Next, operation of the first and the second pseudo-random pattern generators 23 and 28 shown in FIG. 2 will be described.

For example, the first output parallel signal 35, which has been appropriately initialized by the initialization signal 34 of which value is all "1", is output from the first shift register 33. Then, the first output parallel signal 35 is converted into the first PN pattern output signal 37 based on 16 parallel channels, and the second PN pattern output signal 38 based on 31 parallel channels, in the first EXOR group 36.

Feeding back the second PN pattern output signal 38 to the first shift register 33 permits a PN pattern signal to be generated continuously, until the-next initialization signal 34 is inputted, according to the following loop: the first shift register 33—the first output parallel signal 35—the first EXOR group 36—the second PN pattern output signal 38—the first shift register 33. The first PN pattern output signal 37 is inserted in each path of the optical transceiver 1, and is used for evaluation of the optical transceiver 1.

Figure 3:
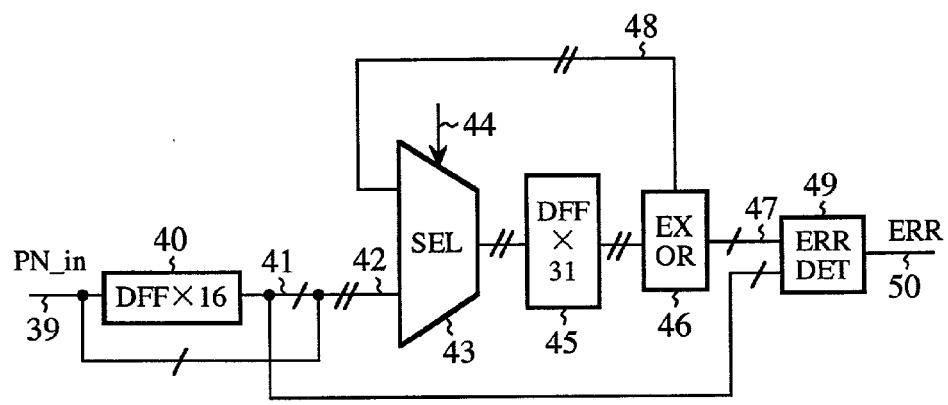
FIG. 3 is a block diagram illustrating a configuration of first and second pseudo-random pattern detectors of the optical transceiver according to the first embodiment of the present invention.

FIG. 3 is a block diagram illustrating a configuration of the first and the second pseudo-random pattern detectors 21 and 26. As is the case with the example of the first and the second pseudo-random pattern generators 23 and 28 show in FIG. 2, this example will be described on the assumption that a number of parallel data is 16, and that a number of PN steps is 31. In FIG. 3, reference numeral 39 denotes a PN pattern input signal based on 16 parallel channels; 40 denotes a second shift register in which 16 DFFs are placed in parallel; 41, a second output parallel signal based on 16 parallel channels, which is output from the second shift register 40; and 42, a parallel signal based on 32 parallel channels, in which the PN pattern input signal 39 and the second output parallel signal 41 are arranged in parallel.

In addition, in FIG. 3, reference numeral 43 denotes a fifth selector; 44 denotes a selection signal for switching an input of the fifth selector 43; 45, a third shift register in which 31 DFFs are placed in parallel; 46, a second EXOR group; 47, a third PN pattern output signal based on 16 parallel channels; 48, a fourth PN pattern output signal based on 31 parallel channels; 49, an error detecting device that compares codes of the second output parallel signal 41 with those of the third PN pattern output signal 47 to detect an error; and 50, an error output that is output from the error detecting device 49.

Next, operation of the first and the second pseudo-random pattern detectors 21 and 26 shown in FIG. 3 will be described.

Figure 4:
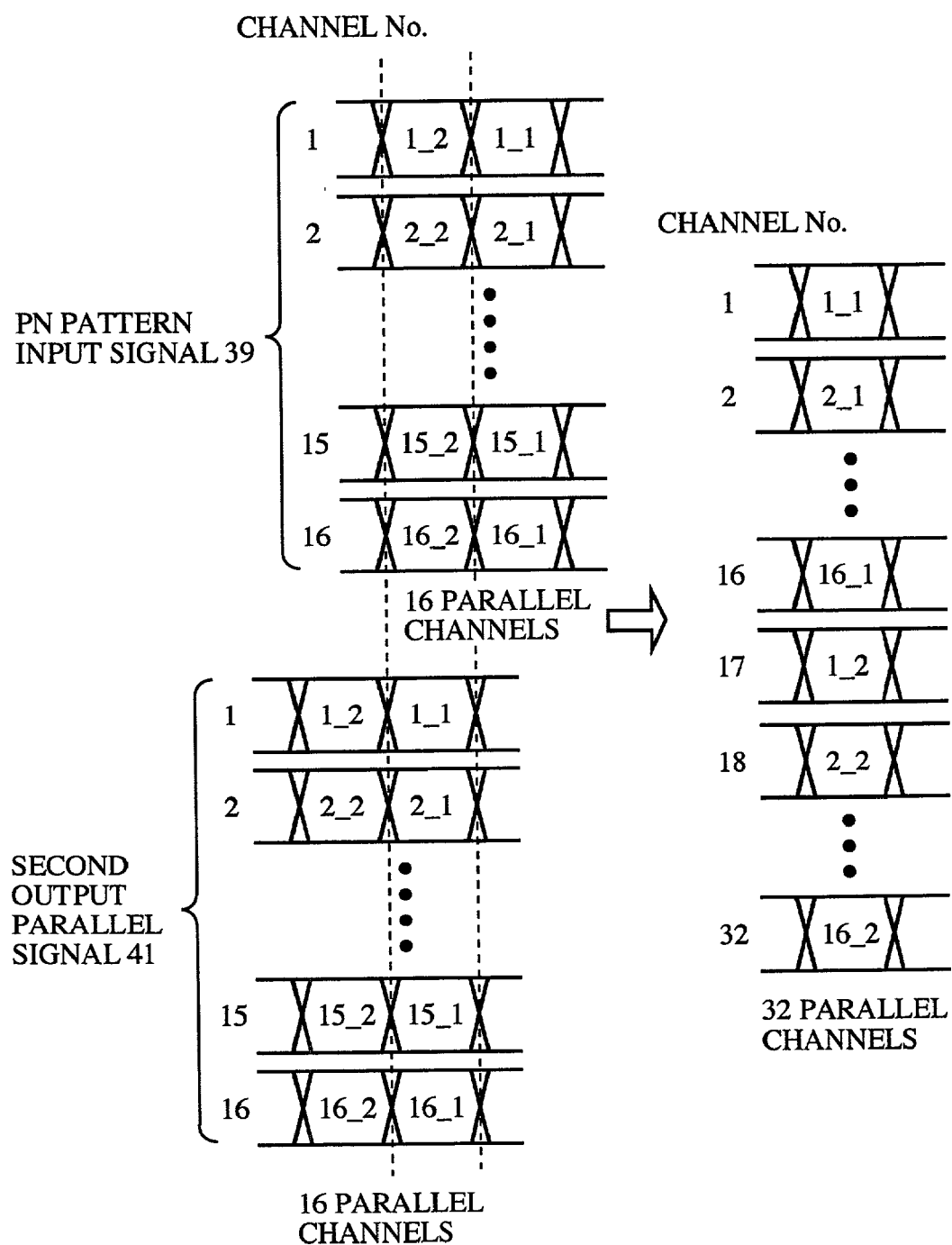
FIG. 4 is a timing chart illustrating the first and the second pseudo-random pattern detectors of the optical transceiver according to the first embodiment of the present invention.

FIG. 4 is a diagram illustrating a signal based on 32 parallel channels, in which the PN pattern input signal 39 based on 16 parallel channels and the second output parallel signals 41 based on 16 parallel channels are arranged in parallel. The second output parallel signal 41 is mixed with the second shift register 40 from the PN pattern input signal 39 as shown in FIG. 4. Then, the mixed signal is inputted into the fifth selector 43 as the parallel signal 42 based on 32 parallel channels.

The fifth selector 43 selects the parallel signal 42 based on 32 parallel channels using the selection signal 44, and inputs the parallel signal 42 to the third shift register 45 as an initial value. However, what is inputted is a signal from 31 parallel channels; a signal from a 32nd parallel channel is not inputted. After the parallel signal is inputted into the third shift register 45 as an initial value, the fifth selector 43 switches the inputted signal to the fourth PN pattern output signal 48, which is from the second EXOR group 46, using the selection signal 44.

A parallel signal, which is output from the third shift register 45, is inputted to the second EXOR group 46 where the parallel signal is converted into the third PN pattern output signal 47 based on 16 parallel channels and the fourth PN pattern output signal 48 based on 31 parallel channels. As is the case with the operation of the first and the second pseudo-random pattern generators 23, 28 described above, since the fourth PN pattern output signal 48 is inputted to the third shift register 45 through the fifth selector 43, the PN pattern is continuously generated until a next initial value is inputted.

Codes of the third PN pattern output signal 47 and the second output parallel signal 41 are compared in the error detecting device 49. If an error has been detected in the comparison between them, an error signal is output from an error output 50.

As described above, according to the first embodiment, in the transmitting side path 6, the optical transceiver 1 comprises the first pseudo-random pattern detector 21 and the first pseudo-random pattern generator 23; and in the receiving side path 11, the optical transceiver 1 comprises the second pseudo-random pattern detector 26 and the second pseudo-random pattern generator 28. Therefore, the following effects are exhibited: not only evaluation and testing of the whole optical transceiver 1, the transmitting side path 6, and the receiving side path 11, but also evaluation and testing of individual parts inside the optical transceiver 1 become possible; and thus, a malfunction path can be identified when malfunction occurs in the optical transceiver 1.

In addition, according to the first embodiment, performing a PN pattern signal generating function and a PN pattern signal detecting function simultaneously permits the first and the second pseudo-random pattern generators/detectors 25 and 30 to perform evaluation and testing of a plurality of paths simultaneously. This exhibits an effect of enabling efficient evaluation and testing of the optical transceiver 1.

(Second Embodiment)

Figure 5:
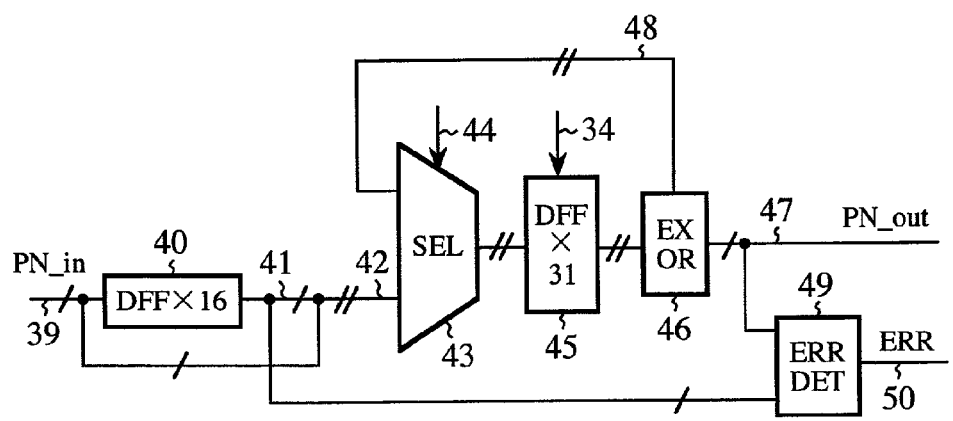
FIG. 5 is a block diagram illustrating a configuration of an integral pseudo-random pattern generator/detector of an optical transceiver according to a second embodiment of the present invention.

FIG. 5 is a block diagram illustrating a configuration of an integral pseudo-random pattern generator/detector (PN_GC) of the optical transceiver 1 according to a second embodiment of the present invention. In FIG. 5, parts common to those in FIGS. 2 and 3 are denoted by the same reference numerals and the duplicate description thereof will be omitted.

A deference between the configuration of the integral pseudo-random pattern generator/detector shown in FIG. 5 and the configuration of the first and the second pseudo-random pattern detectors 21, 26 shown in FIG. 3 resides in that, in FIG. 5, an initialization signal 34, which gives an appropriate initial value (for example, all "1", etc.), is inputted to the third shift register 45, and that the third PN pattern output signal 47 is inputted to the error detecting device 49 while the third PN pattern output signal 47 is output as a PN pattern signal generated by the PN pattern generating function. The PN pattern signal generated here is inputted to the first selector 24 or the second selector 29, which is shown in FIG. 1.

Next, operation will be described.

In FIG. 5, when using this integral pseudo-random pattern generator/detector as a pseudo-random pattern generator, the fifth selector 43 selects the fourth PN pattern output signal 48, gives an appropriate initial value from the initialization signal 34 to the third shift register 45, generates the third PN pattern output signal 47 based on 16 parallel channels, and then outputs the third PN pattern output signal 47 as a PN pattern signal.

In addition, in FIG. 5, when using this integral pseudo-random pattern generator/detector as a pseudo-random pattern detector, the fifth selector 43 selects the parallel signal 42 based on 32 parallel channels, and input the parallel signal 42 to the third shift register 45 as an initial value. After that, a PN pattern signal is generated by the same operation as that of the first and the second pseudo-random pattern detectors 21, 26 of the first embodiment, and the second output parallel signal 41 is compared with the third PN pattern output signal 47 in the error detecting device 49. If there is an error in the comparison between them, an error signal is output from an error output 50.

Moreover, it is possible to generate the PN pattern signal using an arbitrary PN pattern signal as an initial value. Therefore, if generation of the PN pattern signal is started using an initial value at the time of the PN pattern signal detection, the generating function and the detecting function of the PN pattern signal can be performed simultaneously in this integral pseudo-random pattern generator/detector.

As described above, according to the second embodiment, since the integral pseudo-random pattern generator/detector is configured to have the pseudo-random pattern generating function and the pseudo-random pattern detecting function in one circuit, a circuit size can be reduced and low power consumption can be achieved.

Furthermore, according to the second embodiment, this integral pseudo-random pattern generator/detector is configured to perform the pseudo-random pattern generating function and the pseudo-random pattern detecting function simultaneously, a plurality of paths can be evaluated and tested simultaneously; and the evaluation and the testing of the optical transceiver 1 can be performed efficiently.

(Third Embodiment)

Figure 6:
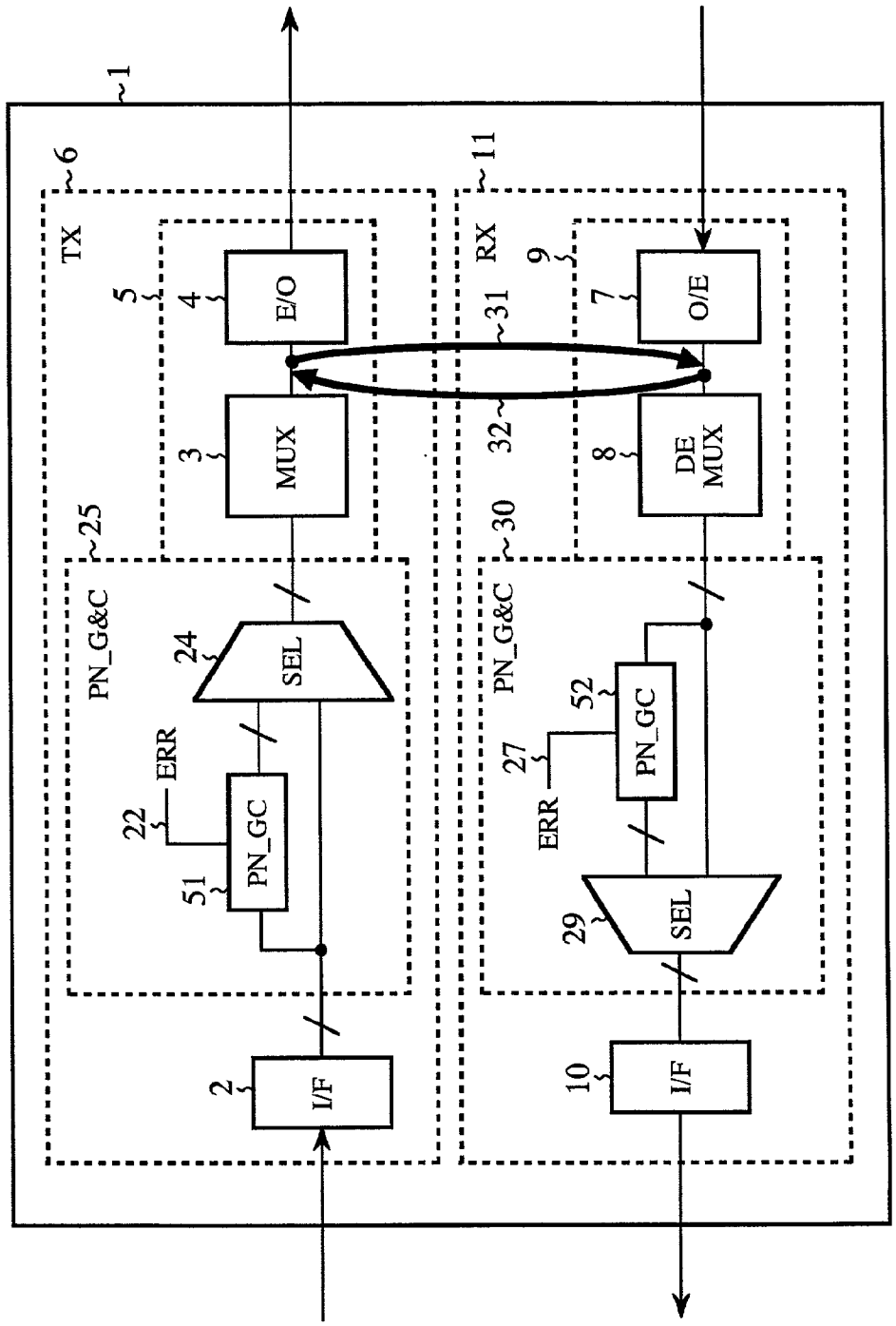
FIG. 6 is a block diagram illustrating a configuration of an optical transceiver according to a third embodiment of the present invention.
Figure 19:
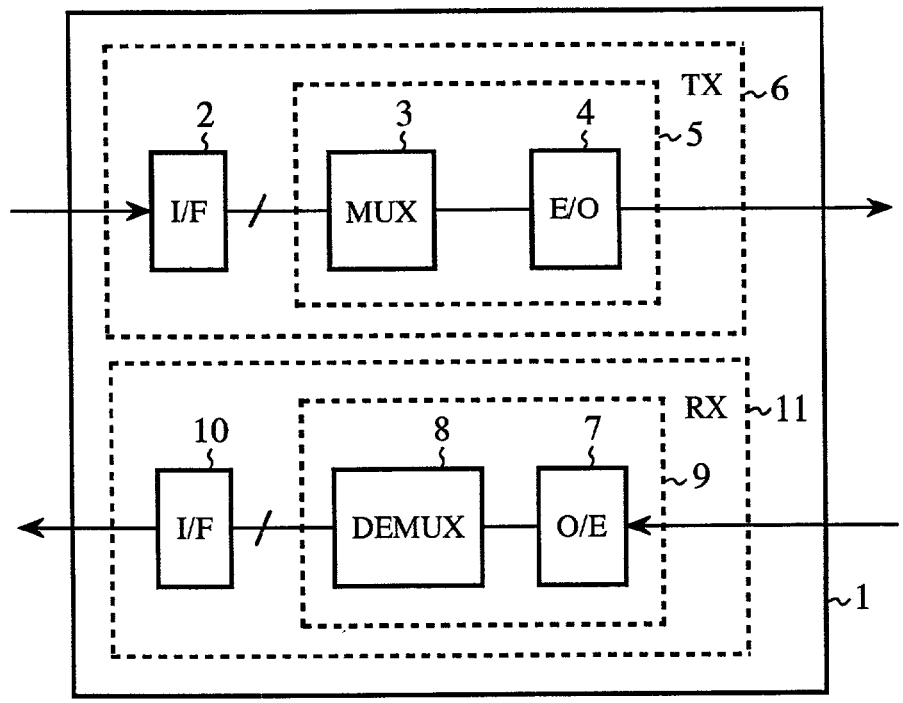
FIG. 19 is a block diagram illustrating a configuration of a conventional optical transceiver.
Figure 20:
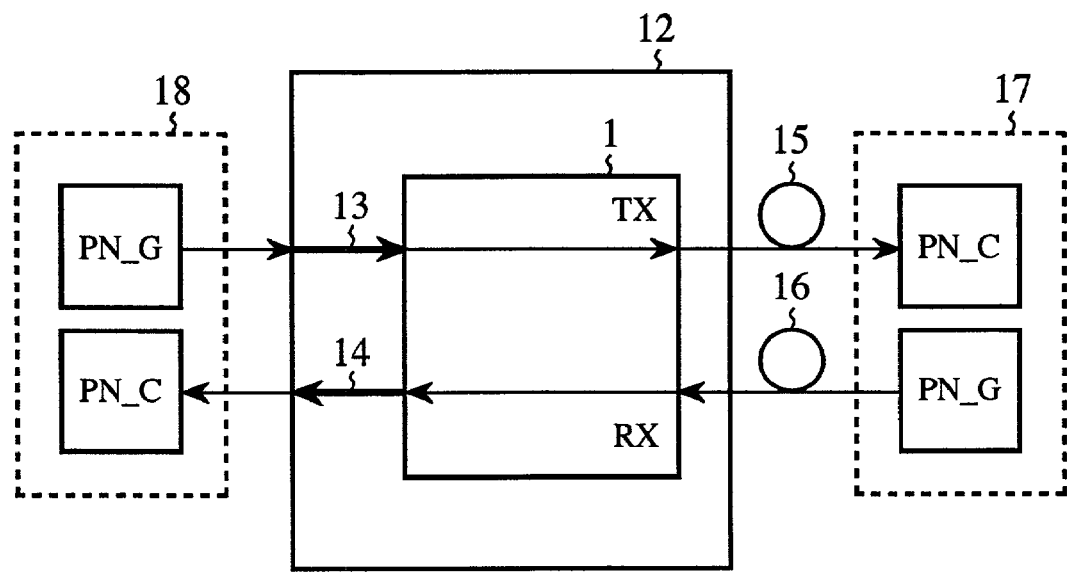
FIG. 20 is a diagram illustrating a method for evaluating and testing the conventional optical transceiver.

FIG. 6 is a block diagram illustrating a configuration of an optical transceiver according to a third embodiment of the present invention. Parts, which are common to those in FIGS. 1 and 19, are denoted by the same reference numerals and description thereof will be omitted. In FIG. 6, reference numeral 51 denotes the first integral pseudo-random pattern generator/detector (PN_GC) shown in the second embodiment; and 52 denotes the second integral pseudo-random pattern generator/detector (PN_GC) that has the same configuration as that of the first integral pseudo-random pattern generator/detector.

In this connection, because operation is similar to that shown in the first embodiment, description of the operation will be omitted. However, the first integral pseudo-random pattern generator/detector 51 has both functions of the first pseudo-random pattern detector 21 and the first pseudo-random pattern generator 23 according to the first embodiment; and the second integral pseudo-random pattern generator/detector 52 has both the functions of the second pseudo-random pattern detector 26 and the second pseudo-random pattern generator 28 according to the first embodiment.

As described above, according to the third embodiment, in the transmitting side path 6, the optical transceiver 1 comprises the first integral pseudo-random pattern generator/detector 51; and in the receiving side path 11, the optical transceiver 1 comprises the second integral pseudo-random pattern generator/detector 52. Therefore, the following effects are exhibited: not only evaluation and testing of the whole optical transceiver 1, the transmitting side path 6, and the receiving side path 11, but also evaluation and testing of individual parts inside the optical transceiver 1 become possible; and thus, a malfunction path can be identified when malfunction occurs in the optical transceiver 1.

Moreover, according to the third embodiment, by using the first and the second integral pseudo-random pattern generators/detectors 51 and 52, the optical transceiver 1 with a reduced circuit size and low power consumption can be realized.

In addition, according to the third embodiment, performing the PN pattern signal generating function and the PN pattern signal detecting function simultaneously permits the first and the second integral pseudo-random pattern generators/detectors 51 and 52 to perform evaluation and testing of a plurality of paths simultaneously. This exhibits an effect of enabling efficient evaluation and testing of the optical transceiver 1.

(Fourth Embodiment)

Figure 7:
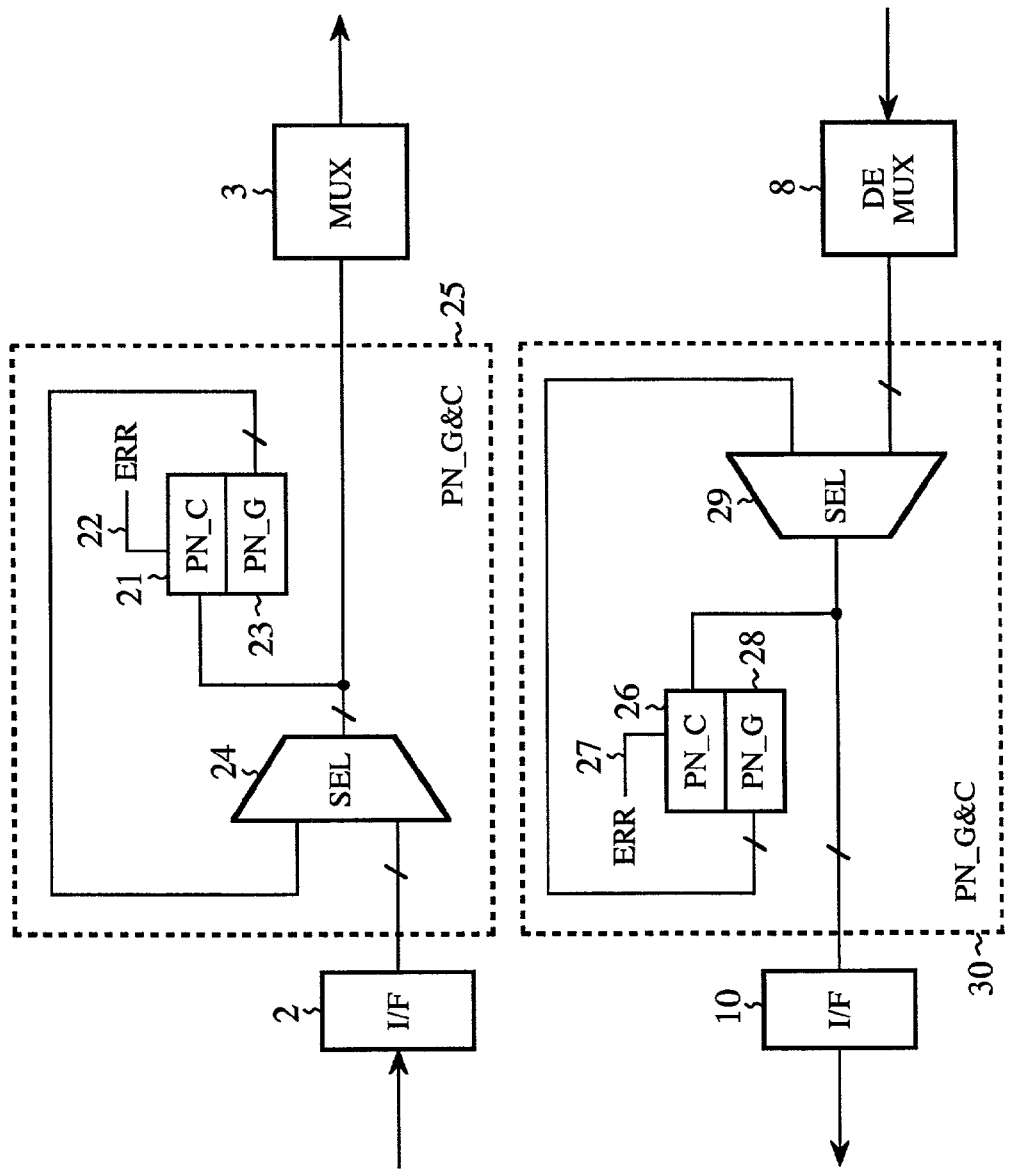
FIG. 7 is a block diagram illustrating a configuration of a first pseudo-random pattern generator/detector and a second pseudo-random pattern generator/detector of an optical transceiver according to a fourth embodiment of the present invention.

FIG. 7 is a block diagram illustrating configurations of the first pseudo-random pattern generator/detector 25 and the second pseudo-random pattern generator/detector 30 according to a fourth embodiment of the present invention, which are placed in the transmitting side path 6 and the receiving side path 11 in the optical transceiver 1, respectively. Parts, which are common to those of the first pseudo-random pattern generator/detector 25 and the second pseudo-random pattern generator/detector 30 according to the first embodiment shown in FIG. 1, are denoted by the same reference numerals and the description thereof will be omitted. Additionally, because a configuration as the optical transceiver 1 is similar to that shown in FIG. 1, description of the configuration will be omitted.

There are the following points of difference between FIGS. 1 and 7: in the first pseudo-random pattern generator/detector 25, order of the first pseudo-random pattern detector 21 and the first pseudo-random pattern generator 23, and the first selector 24 is reverse; and in a similar manner, in the second pseudo-random pattern generator/detector 30, order of the second pseudo-random pattern detector 26 and the second pseudo-random pattern generator 28, and the second selector 29 is reverse.

Next, operation will be described.

Operation of the first pseudo-random pattern generator/detector 25 placed in the transmitting side path 6 will be described with reference to FIG. 7 here. However, the second pseudo-random pattern generator/detector 30 placed in the receiving side path 11 also operates in a similar manner. In addition, since operation of the optical transceiver 1 as a whole is similar to that shown in the first embodiment, description of the operation will be omitted.

The PN pattern signal, which has been inputted from the low-speed parallel input interface 2, is inputted to the first selector 24 before the PN pattern signal is inputted to the first pseudo-random pattern detector 21. Therefore, it is possible to evaluate and test a path (the low-speed parallel input interface 2—the first selector 24). The first pseudo-random pattern detector 21 evaluates the PN pattern signal to detect an error.

In addition, the PN pattern signal, which has been generated by the first pseudo-random pattern generator 23, is inputted to the multiplexing circuit 3 through the first selector 24. Therefore, it is possible to evaluate a path including the first selector 24 and the multiplexing circuit 3.

In the first pseudo-random pattern generator/detector 25 shown in FIG. 7, evaluation and testing of each path are performed through the first selector 24. Therefore, the first selector 24 is evaluated and tested repeatedly, which enables a crosscheck of the first selector 24.

As described above, according to the fourth embodiment, in the transmitting side path 6, the optical transceiver 1 comprises the first pseudo-random pattern detector 21 and the first pseudo-random pattern generator 23; and in the receiving side path 11, the optical transceiver 1 comprises the second pseudo-random pattern detector 26 and the second pseudo-random pattern generator 28. Therefore, the following effects are exhibited: not only evaluation and testing of the whole optical transceiver 1, the transmitting side path 6, and the receiving side path 11, but also evaluation and testing of individual parts inside the optical transceiver 1 become possible; and thus, a malfunction path can be identified when malfunction occurs in the optical transceiver 1.

Moreover, according to the fourth embodiment, the following effect is exhibited: a cross-check of a path including the first selector 24 or the second selector 29, which could not be performed by the optical transceiver 1 according to the first embodiment, becomes possible.

(Fifth Embodiment)

As regards block diagram illustrating a configuration of the first pseudo-random pattern generator/detector 25 according to a fifth embodiment of the present invention, which is placed in the transmitting side path 6 in the optical transceiver 1, the first pseudo-random pattern detector 21 and the first pseudo-random pattern generator 23 shown in FIG. 7 according to the fourth embodiment are replaced with the first integral pseudo-random pattern generator/detector 51 shown in FIG. 6 according to the third embodiment; and a configuration of the second pseudo-random pattern generator/detector 30 placed in the receiving side path 11 is also replaced with the second integral pseudo-random pattern generator/detector 52.

In this connection, since description of operation is similar to that shown in the fourth embodiment, the description will be omitted. However, the first integral pseudo-random pattern generator/detector 51 has both the functions of the first pseudo-random pattern detector 21 and the first pseudo-random pattern generator 23 according to the first embodiment; and the second integral pseudo-random pattern generator/detector 52 has both functions of the second pseudo-random pattern detector 26 and the second pseudo-random pattern generator 28 according to the first embodiment.

As described above, according to the fifth embodiment, in the transmitting side path 6, the optical transceiver 1 comprises the first integral pseudo-random pattern generator/detector 51; and in the receiving side path 11, the optical transceiver 1 comprises the second integral pseudo-random pattern generator/detector 52. Therefore, the following effects are exhibited: not only evaluation and testing of the whole optical transceiver 1, the transmitting side path 6, and the receiving side path 11, but also evaluation and testing of individual parts inside the optical transceiver 1 become possible; and thus, a malfunction path can be identified when malfunction occurs in the optical transceiver 1.

Moreover, according to the fifth embodiment, the following effect is exhibited: a cross-check of a path including the first selector 24 or the second selector 29, which could not be performed by the optical transceiver 1 according to the first embodiment, becomes possible.

Furthermore, according to the fifth embodiment, by using the first and the second integral pseudo-random pattern generators/detectors 51 and 52, the first and the second pseudo-random pattern generators/detectors with a reduced circuit size and low power consumption can be realized.

(Sixth Embodiment)

Figure 8:
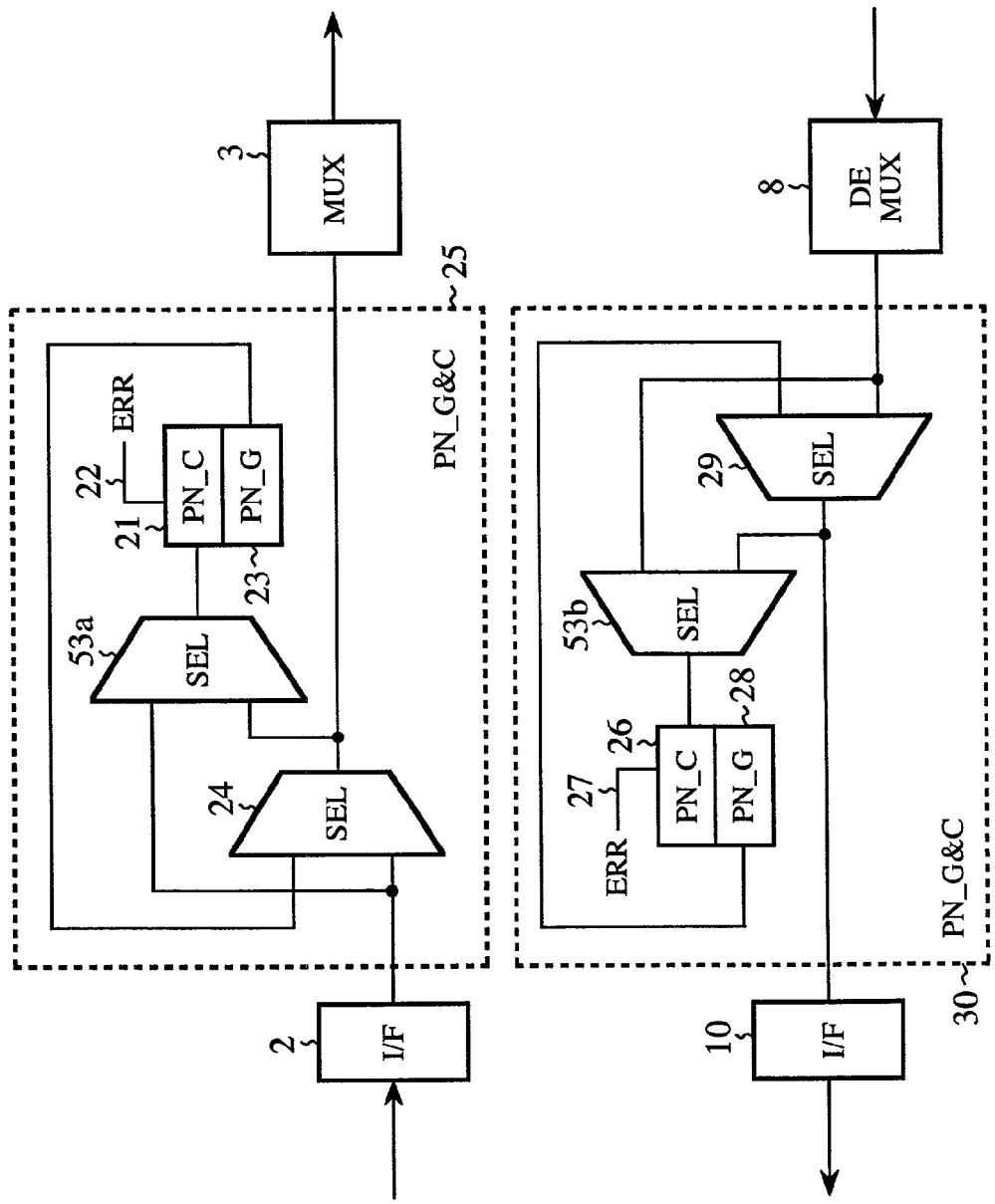
FIG. 8 is a block diagram illustrating a configuration of a first pseudo-random pattern generator/detector and a second pseudo-random pattern generator/detector of an optical transceiver according to a sixth embodiment of the present invention.

FIG. 8 is a block diagram illustrating configurations of the first pseudo-random pattern generator/detector 25 and the second pseudo-random pattern generator/detector 30 according to a sixth embodiment of the present invention, which are placed in the transmitting side path 6 and the receiving side path 11 in the optical transceiver 1 respectively. In FIG. 8, reference numeral 53a denotes a third selector for selecting an inputted PN pattern signal or an output signal of the first selector 24; 53b denotes a fourth selector for selecting an inputted PN pattern signal or an output signal of the second selector 29; and others are similar to the configuration shown in FIG. 7 according to the fourth embodiment. Additionally, since a configuration of the optical transceiver 1 is similar to that shown in FIG. 1, description of the configuration will be omitted.

Next, operation will be described.

Operation of the first pseudo-random pattern generator/detector 25 placed in the transmitting side path 6 will be described with reference to FIG. 8 here. The second pseudo-random pattern generator/detector 30 placed in the receiving side path 11 also operates in a similar manner. In addition, since operation of the optical transceiver 1 as a whole is similar to that shown in the first embodiment, description of the operation will be omitted.

When evaluating and testing a path of the low-speed parallel input interface 2, a PN pattern signal is inputted to the low-speed parallel input interface 2. After that, the third selector 53a selects the PN pattern signal from the low-speed parallel input interface 2, and inputs the PN pattern signal to the first pseudo-random pattern detector 21.

In addition, when evaluating and testing a path, including the first selector 24, from the low-speed parallel input interface 2, a PN pattern signal is inputted to the low-speed parallel input interface 2. After that, the third selector 53a selects the PN pattern signal from the first selector 24, and then inputs the PN pattern signal to the first pseudo-random pattern detector 21.

Moreover, the PN pattern signal, which has been generated by the first pseudo-random pattern generator 23, is inputted to the multiplexing circuit 3 through the first selector 24. Therefore, it is possible to evaluate a path including the first selector 24 and the multiplexing circuit 3. Moreover, selection of the first pseudo-random pattern generator 23 by the first selector 24, and selection of an output of the low-speed parallel input interface 2 by the third selector 53a, enables simultaneous evaluation of the low-speed parallel input interface 2 and a path (the first selector 24—the multiplexing circuit 3).

In addition, selection of an output of the low-speed parallel input interface 2 by the first selector 24 and the third selector 53a enables simultaneous evaluation of the low-speed parallel input interface 2 and a path (the low-speed parallel input interface 2—the first selector 24 the multiplexing circuit 3).

As described above, according to the sixth embodiment, in the transmitting side path 6, the optical transceiver 1 comprises the first pseudo-random pattern detector 21 and the first pseudo-random pattern generator 23; and in the receiving side path 11, the optical transceiver 1 comprises the second pseudo-random pattern detector 26 and the second pseudo-random pattern generator 28. Therefore, the following effects are exhibited: not only evaluation and testing of the whole optical transceiver 1, the transmitting side path 6, and the receiving side path 11, but also evaluation and testing of individual parts inside the optical transceiver 1 become possible; and thus, a malfunction path can be identified when malfunction occurs in the optical transceiver 1.

In addition, according to the sixth embodiment, permitting the third selector 53a to select a signal that will be inputted to the first pseudo-random pattern detector 21, and permitting the fourth selector 53b to select a signal that will be inputted to the second pseudo-random pattern detector 26, exhibit the following effect: selection as to whether or not the first selector 24 and the second selector 29 are included in a path, which should be evaluated, become possible.

Furthermore, according to the sixth embodiment, performing the PN pattern signal generating function and the PN pattern signal detecting function simultaneously permits the first and the second pseudo-random pattern generators/detectors 25 and 30 to perform evaluation and testing of a,plurality of paths simultaneously. This exhibits an effect of enabling efficient evaluation and testing of the optical transceiver 1.

(Seventh Embodiment)

As regards a block diagram illustrating a configuration of the first pseudo-random pattern generator/detector 25 according to a seventh embodiment of the present invention, which is placed in the transmitting side path 6 in the optical transceiver 1, the first pseudo-random pattern detector 21 and the first pseudo-random pattern generator 23 shown in FIG. 8 according to the sixth embodiment are replaced with the first integral pseudo-random pattern generator/detector 51 shown in FIG. 6 according to the third embodiment; and a configuration of the second pseudo-random pattern generator/detector 30 placed in the receiving side path 11 is also replaced with the second integral pseudo-random pattern generator/detector 52.

In this connection, since description of operation is similar to that shown in the sixth embodiment, the description will be omitted. However, the first integral pseudo-random pattern generator/detector 51 has both the functions of the first pseudo-random pattern detector 21 and the first pseudo-random pattern generator 23 according to the first embodiment; and the second integral pseudo-random pattern generator/detector 52 has both functions of the second pseudo-random pattern detector 26 and the second pseudo-random pattern generator 28 according to the first embodiment.

As described above, according to the seventh embodiment, in the transmitting side path 6, the optical transceiver 1 comprises the first integral pseudo-random pattern generator/detector 51; and in the receiving side path 11, the optical transceiver 1 comprises the second integral pseudo-random pattern generator/detector 52. Therefore, the following effects are provided: not only evaluation and testing of the whole optical transceiver 1, the transmitting side path 6, and the receiving side path 11, but also evaluation and testing of individual parts inside the optical transceiver 1 become possible; and thus, a malfunction path can be identified when malfunction occurs in the optical transceiver 1.

In addition, according to the seventh embodiment, the following effects are exhibited: by permitting the third selector 53a to select a signal, which will be inputted to the first pseudo-random pattern detector 51, selection as to whether or not the first selector 24 is included in a path to be evaluated becomes possible; and by permitting the fourth selector 53b to select a signal, which will be inputted to the second integral pseudo-random pattern generator/detector 52, selection as to whether or not the second selector 29 is included in a path to be evaluated becomes possible.

Moreover, according to the seventh embodiment, by using the first and the second integral pseudo-random pattern generators/detectors 51 and 52, the first and the second pseudo-random pattern generators/detectors with a reduced circuit size and low power consumption can be realized.

Furthermore, according to the seventh embodiment, performing the PN pattern signal generating function and the PN pattern signal detecting function simultaneously permits the first and the second pseudo-random pattern generators/detectors 25 and 30 to perform evaluation and testing of a plurality of paths simultaneously. This exhibits an effect of enabling efficient evaluation and testing of the optical transceiver 1.

(Eighth Embodiment)

Figure 9:
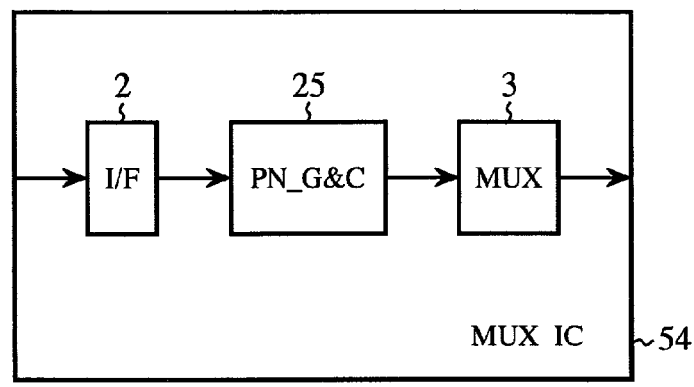
FIG. 9 is a block diagram illustrating a configuration of a multiplexing integrated circuit according to an eighth embodiment of the present invention.

FIG. 9 is a block diagram illustrating a configuration of a multiplexing integrated circuit according to an eighth embodiment of the present invention. In FIG. 9, reference numeral 54 denotes a multiplexing integrated circuit (MUX IC). Components in the multiplexing integrated circuit 54 are similar to those shown in FIG. 1, and similar reference numerals have been used for the components. Therefore, description of the components will be omitted.

Next, operation will be described.

It is possible to evaluate and test the low-speed parallel input interface 2 by inputting a PN pattern signal, which is inputted by the low-speed parallel input interface 2, to the first pseudo-random pattern generator/detector 25, and checking whether or not there is an error of the PN pattern signal.

Moreover, it is possible to evaluate and test the multiplexing circuit 3 by inputting the PN pattern signal, which has been generated by the first pseudo-random pattern generator/detector 25, to an electric measuring instrument outside the multiplexing integrated circuit 54 through the multiplexing circuit 3, and checking whether or not there is an error using a PN pattern signal detecting function of the electric measuring instrument, etc.

When operating the multiplexing integrated circuit 54 normally, a data signal inputted to the multiplexing integrated circuit 54 is passed through the first pseudo-random pattern generator/detector 25 without processing.

As described above, according to the eighth embodiment, since the multiplexing integrated circuit 54 is configured to have the first pseudo-random pattern generator/detector 25 that is incorporated therein, it is possible to evaluate and test paths in the multiplexing integrated circuit 54 individually.

(Ninth Embodiment)

Figure 10:
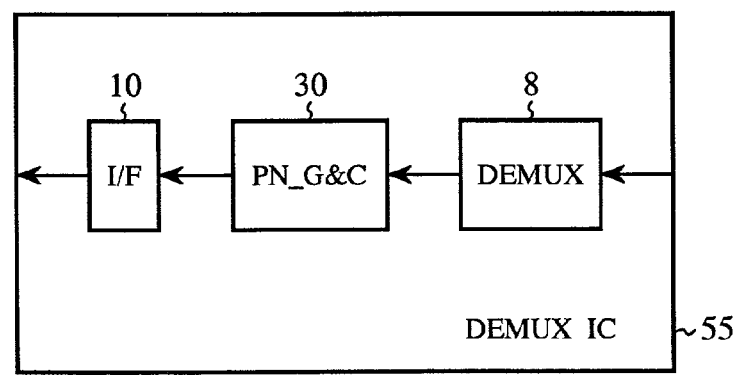
FIG. 10 is a block diagram illustrating a configuration of a demultiplexing integrated circuit according to a ninth embodiment of the present invention.

FIG. 10 is a block diagram illustrating a configuration of a demultiplexing integrated circuit according to a ninth embodiment of the present invention. In FIG. 10, reference numeral 55 denotes a demultiplexing integrated circuit (DE- MUX IC). Components in the demultiplexing integrated circuit 55 are similar to those shown in FIG. 1, and similar reference numerals have been used for the components. Therefore, description of the components will be omitted.

Next, operation will be described.

It is possible to evaluate and test the demultiplexing circuit 8 by inputting a PN pattern signal from the demultiplexing circuit 8 to the second pseudo-random pattern generator/detector 30, and checking whether or not there is an error of the PN pattern signal.

Moreover, it is possible to evaluate and test the low-speed parallel output interface 10 by the following: inputting the PN pattern signal, which has been generated by the second pseudo-random pattern generator/detector 30, to an electric measuring instrument outside the demultiplexing integrated circuit 55 through the low-speed parallel output interface 10; and checking whether or not there is an error using the PN pattern signal detecting function of the electric measuring instrument, etc.

When operating the demultiplexing integrated circuit 55 normally, a data signal inputted to the demultiplexing integrated circuit 55 is passed through the second pseudo-random pattern generator/detector 30 without processing.

As described above, according to the ninth embodiment, the demultiplexing integrated circuit 55 is configured to have the second pseudo-random pattern generator/detector 30 that is incorporated therein, it is possible to evaluate and test paths in the demultiplexing integrated circuit 55 individually.

(Tenth Embodiment)

Figure 11:
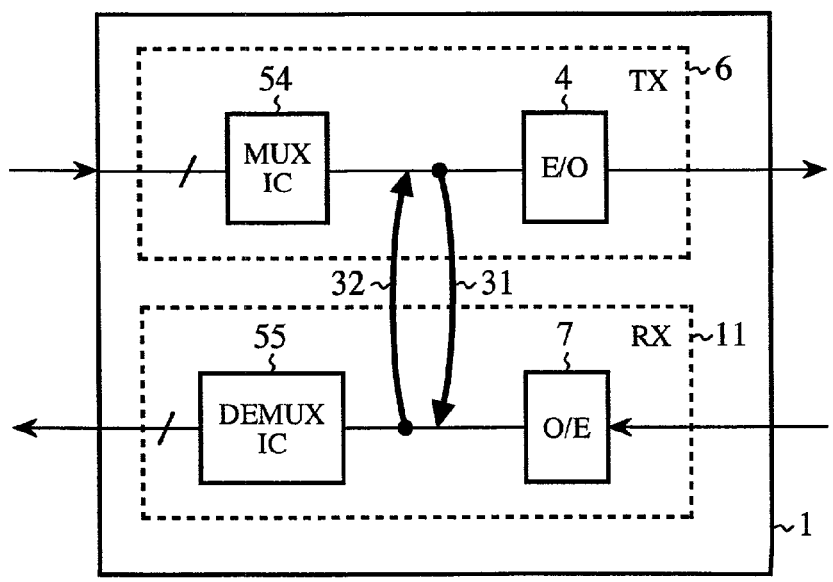
FIG. 11 is a block diagram illustrating a configuration of an optical transceiver according to a tenth embodiment of the present invention.

FIG. 11 is a block diagram illustrating a configuration of an optical transceiver according to a tenth embodiment of the present invention. In FIG. 11, reference numeral 54 denotes the multiplexing integrated circuit shown in FIG. 9 according to the eighth embodiment; and 55 denotes the demultiplexing integrated circuit shown in FIG. 10 according to the ninth embodiment. Components, which are similar to those shown in FIG. 1, are provided with similar reference numerals. Therefore, description of the components will be omitted.

In this connection, operation is similar to that of the optical transceiver 1, which has been described in the first, and the third to seventh embodiments. Therefore, description of the operation will be omitted.

As described above, according to the tenth embodiment, inside the multiplexing integrated circuit 54 of the transmitting side path 6, the optical transceiver 1 comprises the first pseudo-random pattern generator/detector 25; and inside the demultiplexing integrated circuit 55 of the receiving side path 11, the optical transceiver 1 comprises the second pseudo-random pattern generator/detector 30. Therefore, the following effects are exhibited: not only evaluation and testing of the whole optical transceiver 1, the transmitting side path 6, and the receiving side path 11, but also evaluation and testing of individual parts, which are inside the optical transceiver 1, inside the multiplexing integrated circuit 54, and inside the demultiplexing integrated circuit 55, become possible; and thus, a malfunction path can be identified when malfunction occurs in the optical transceiver 1.

Moreover, according to the tenth embodiment, if the first and the second integral pseudo-random pattern generators/detectors 51 and 52 are used, it is possible to realize the first and the second pseudo-random pattern generators/detectors 25 and 30 with a reduced circuit size.

Furthermore, according to the tenth embodiment, the PN pattern signal generating function and the PN pattern signal detecting function are simultaneously performed, which permits the first and the second pseudo-random pattern generators/detectors 25 and 30 to perform evaluation and testing of a plurality of paths simultaneously. This exhibits an effect of enabling efficient evaluation and testing of the optical transceiver 1.

(Eleventh Embodiment)

Figure 12:
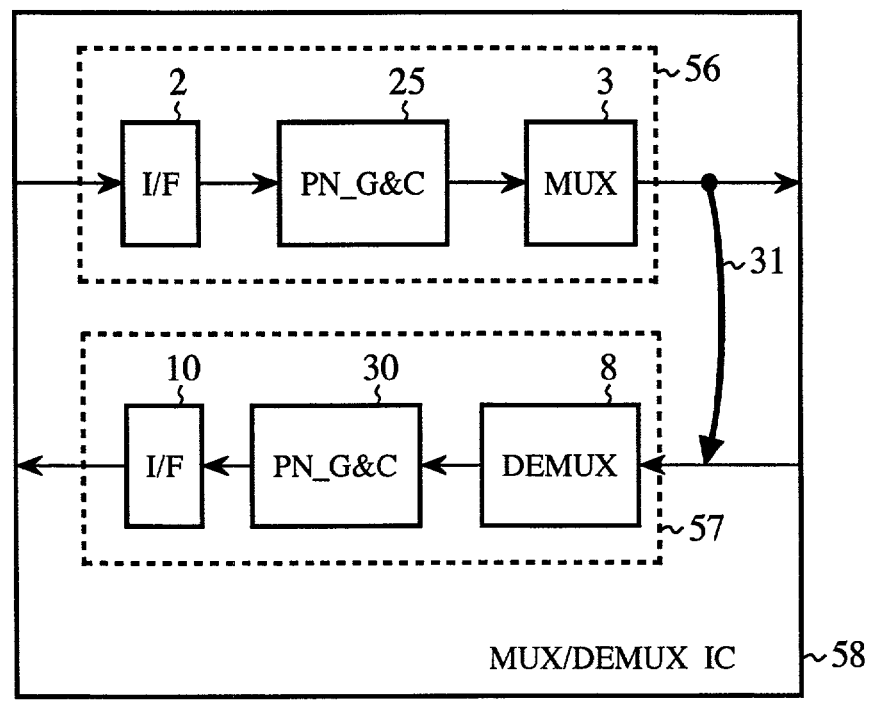
FIG. 12 is a block diagram illustrating a configuration of an integral multiplexing/demultiplexing integrated circuit according to an eleventh embodiment of the present invention.

FIG. 12 is a block diagram illustrating a configuration of an integral multiplexing/demultiplexing integrated circuit according to an eleventh embodiment of the present invention. In FIG. 12, reference numeral 56 denotes a multiplexing portion comprising the low-speed parallel input interface 2, the first pseudo-random pattern generator/detector 25, and the multiplexing circuit 3; 57 denotes a demultiplexing portion comprising the demultiplexing circuit 8, the second pseudo-random pattern generator/detector 30, and the low-speed parallel output interface 10; and 58 denotes an integral multiplexing/demultiplexing integrated circuit (MUX/DEMUX comprising the multiplexing department 56, and the multiplex separation department 57. Components, which are similar to those shown in FIG. 1, are provided with similar reference numerals. Description of the components will be omitted.

Next, operation will be described.

It is possible to evaluate and test the low-speed parallel input interface 2 by inputting an PN pattern signal, which is inputted by an outside electric measuring instrument, etc., to the first pseudo-random pattern generator/detector 25 through the low-speed parallel input interface 2, and checking whether or not there is an error of the PN pattern signal.

In addition, it is possible to evaluate and test a path (the multiplexing portion 56—the first loopback path 31—the demultiplexing circuit 8) by the following: passing the inputted PN pattern signal through the first pseudo-random pattern generator/detector 25 without processing; inputting the PN pattern signal to the second pseudo-random pattern generator/detector 30 through the multiplexing circuit 3, the first loopback path 31, and the demultiplexing circuit 8; and checking whether or not there is an error of the PN pattern signal.

In addition, it is possible to evaluate and test a path (the multiplexing portion 56—the first loopback path 31—the demultiplexing portion 57) by the following: passing the inputted PN pattern signal through the first pseudo-random pattern generator/detector 25 without processing; inputting the PN pattern signal to the demultiplexing circuit 8 through the multiplexing circuit 3 and the first loopback path 31; passing the PN pattern signal through the second pseudo-random pattern generator/detector 30 without processing; outputting the PN pattern signal to the outside electric measuring instrument, etc. from the low-speed parallel output interface 10; and checking whether or not there is an error of the PN pattern signal using the PN pattern signal detecting function of the electric measuring instruments, etc.

In addition, it is possible to evaluate and test the multiplexing circuit 3 by inputting the PN pattern signal, which has been generated by the first pseudo-random pattern generator/detector 25, to the outside electric measuring instrument, etc. through the multiplexing circuit 3, and checking whether or not there is an error of the PN pattern signal using the PN pattern signal detecting function of the electric measuring instrument, etc.

In addition, it is possible to evaluate and test a path (the multiplexing circuit 3—the first loopback path 31—the demultiplexing circuit 8) by inputting the PN pattern signal, which has been generated by the first pseudo-random pattern generator/detector 25, to the second pseudo-random pattern generator/detector 30 through the multiplexing circuit 3, the first loopback path 31, and the demultiplexing circuit 8, and checking whether or not there is an error of the PN pattern signal.

In addition, it is possible to evaluate and test a path (the multiplexing circuit 3—the first loopback path 31—the demultiplexing portion 57) by the following: inputting the PN pattern signal, which has been generated by the first pseudo-random pattern generator/detector 25, to the demultiplexing circuit 8 through the multiplexing circuit 3 and the first loopback path 31; passing the PN pattern signal through the second pseudo-random pattern generator/detector 30 without processing; outputting the PN pattern signal to the outside electric measuring instrument, etc. from the low-speed parallel output interface 10; and checking whether or not there is an error of the PN pattern signal using the PN pattern signal detecting function of the electric measuring instrument, etc.

In addition, it is possible to evaluate and test the low-speed parallel output interface 10 by outputting the PN pattern signal, which has been generated by the second pseudo-random pattern generator/detector 30, to the outside electric measuring instrument, etc. from the low-speed parallel output interface 10, and checking whether or not there is an error of the PN pattern signal using the PN pattern signal detecting function of the electric measuring instrument, etc.

As described above, according to the eleventh embodiment, since the integral multiplexing/demultiplexing integrated circuit 58 is configured to have the first pseudo-random pattern generator/detector 25 and the second pseudo-random pattern generator/detector 30 that are incorporated therein, it is possible to evaluate and test paths inside the integral multiplexing/demultiplexing integrated circuit 58 individually.

(Twelfth Embodiment)

Figure 13:
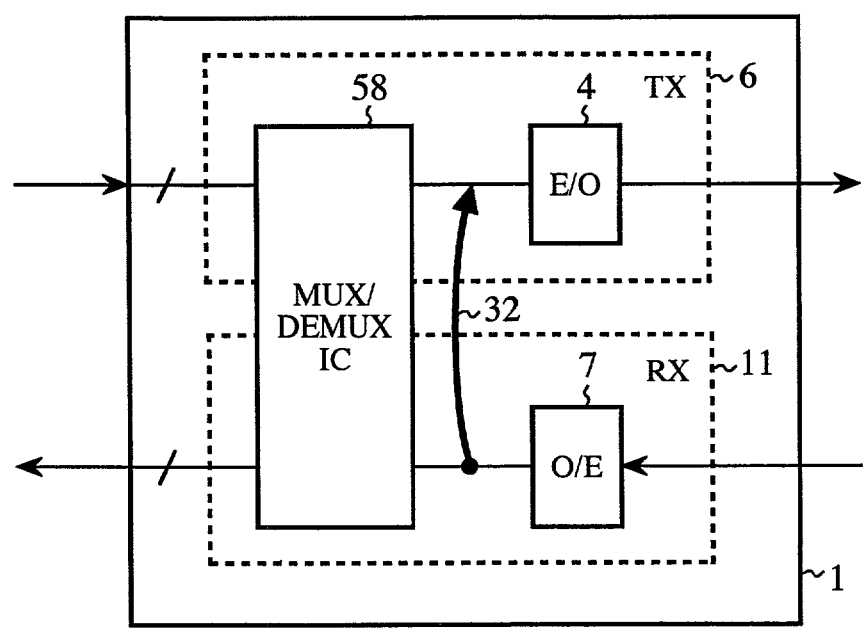
FIG. 13 is a block diagram illustrating a configuration of an optical transceiver according to a twelfth embodiment of the present invention.

FIG. 13 is a block diagram illustrating a configuration of an optical transceiver according to a twelfth embodiment of the present invention. In FIG. 13, reference numeral 58 denotes an integral multiplexing/demultiplexing integrated circuit shown in FIG. 12 according to the eleventh embodiment. Components, which are similar to those shown in FIG. 1, are provided with similar reference numerals and description of the components will be omitted.

Operation is similar to that of the optical transceiver 1 described in the first embodiment. Therefore, description of the operation will be omitted.

As described above, according to the twelfth embodiment, in the transmitting side path 6 inside the integral multiplexing/demultiplexing integrated circuit 58, the optical transceiver 1 comprises the first pseudo-random pattern generator/detector 25; and in the receiving side path 11, the optical transceiver 1 comprises the second pseudo-random pattern generator/detector 30. Therefore, the following effects are exhibited: not only evaluation and testing of the whole optical transceiver 1, the transmitting side path 6, and the receiving side path 11, but also evaluation and testing of individual parts, which are inside the optical transceiver 1 and inside the integral multiplexing/demultiplexing integrated circuit 58, become possible; and thus, a malfunction path can be identified when malfunction occurs in the optical transceiver 1.

Moreover, according to the twelfth embodiment, if the first and the second integral pseudo-random pattern generators/detectors 51, 52 are used, the following effect is exhibited: it is possible to realize the first and the second pseudo-random pattern generators/detectors 25 and 30 with a reduced circuit size.

Furthermore, according to the twelfth embodiment, the PN pattern signal generating function and the PN pattern signal detecting function are simultaneously performed, which permits the first and the second pseudo-random pattern generators/detectors 25 and 30 to perform evaluation and testing of a plurality of paths simultaneously. This exhibits an effect of enabling efficient evaluation and testing of the optical transceiver 1.

(Thirteenth Embodiment)

Figure 14:
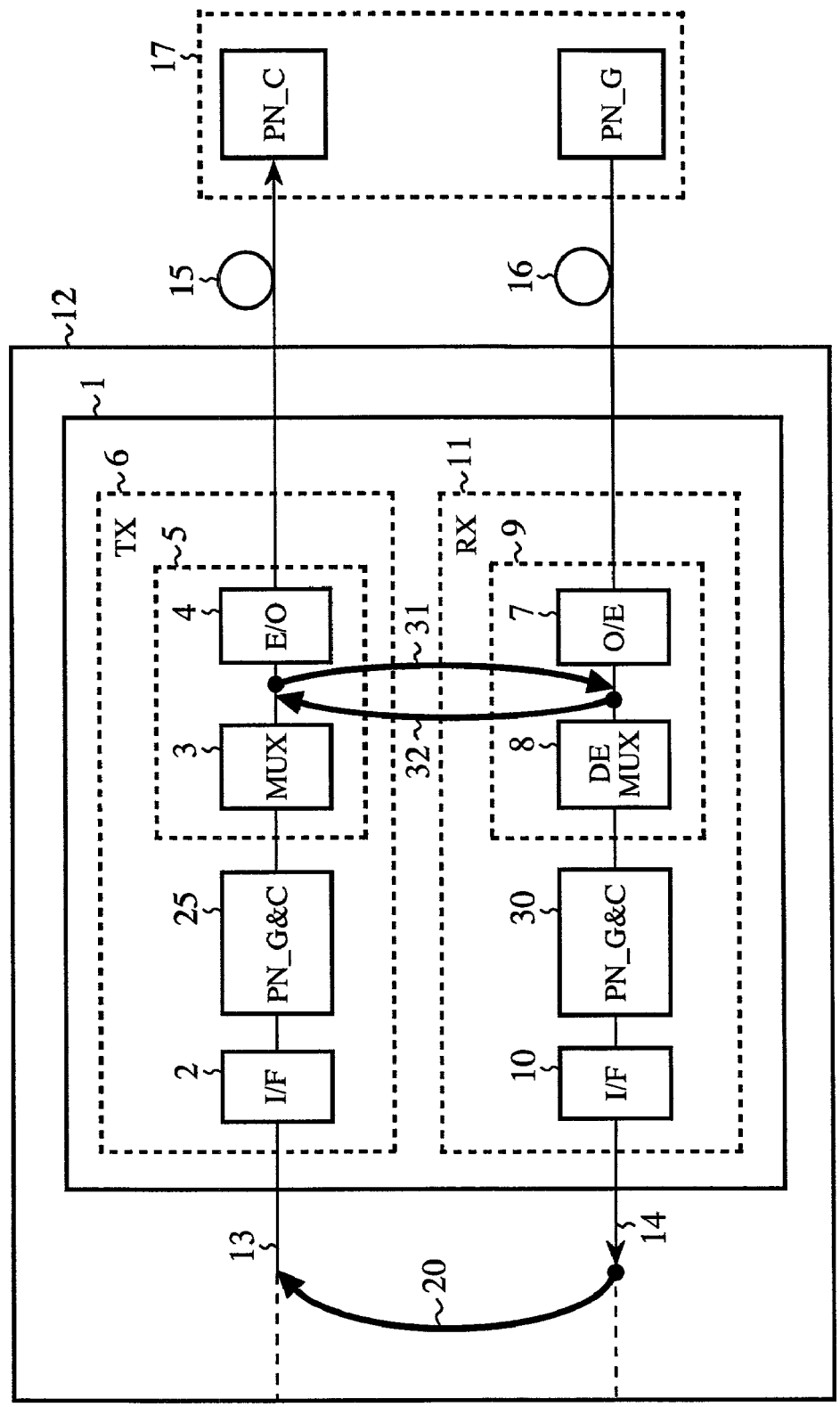
FIG. 14 is a diagram illustrating a method for evaluating and testing an optical transceiver according to a thirteenth embodiment of the present invention.
Figure 22:
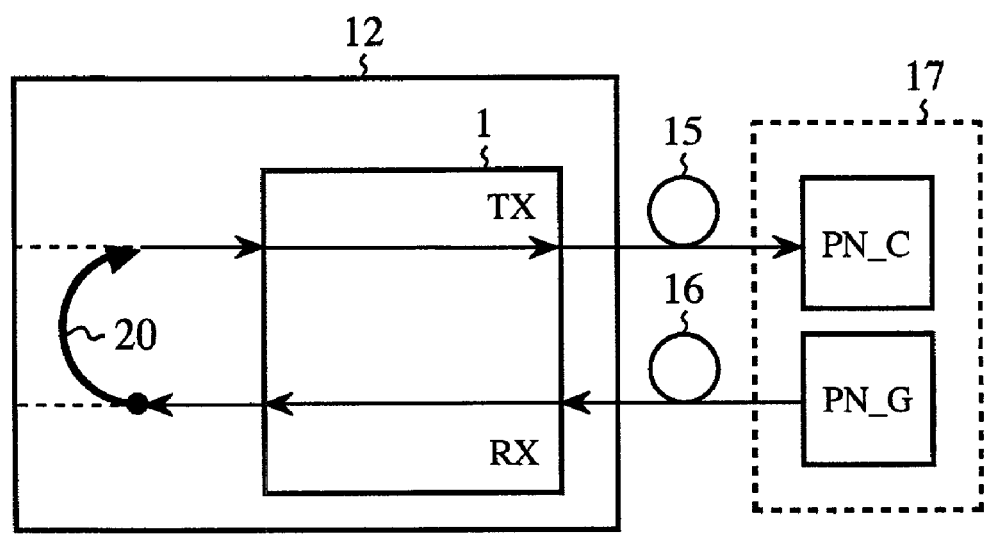
FIG. 22 is a diagram illustrating a method for evaluating and testing the conventional optical transceiver.

FIG. 14 is a diagram illustrating a method for evaluating and testing an optical transceiver 1 according to a thirteenth embodiment of the present invention. A configuration of the optical transceiver 1 shown in FIG. 14 is simplified for illustration. Parts common to those shown in FIGS. 1, 19, and 22 are provided with similar reference numerals. Description of the parts will be omitted.

Next, operation will be described.

Since operation of the optical transceiver 1 as a whole is similar to that shown in the first embodiment, description of the operation will be omitted. The PN pattern signal, which has been generated by the PN_G of the light measuring instrument 17, is inputted to the light-electricity converter 7 of the optical transceiver 1 through the second optical fiber 16. It is possible to evaluate and test a path (the second optical fiber 16—the light-electricity converter 7—the electricity-light converter 4—the first optical fiber 15) by the following: through the second loopback path 32, inputting the PN pattern signal from the electricity-light converter 4 to the light measuring instrument 17 through the first optical fiber 15; and checking whether or not there is an error of the PN pattern signal using the PN_C of the light measuring instrument 17.

It is possible to evaluate and test a path (the second optical fiber 16—the receiving unit 9) by inputting the PN pattern signal, which has been generated by the PN G of the light measuring instrument 17, to the second pseudo-random pattern generator/detector 30 through the demultiplexing circuit 8, and checking whether or not there is an error of the PN pattern signal.

It is possible to evaluate and test a path (the second optical fiber 16—the receiving side path 11—loopback electric wiring 20—the low-speed parallel input interface 2) by the following: passing the PN pattern signal, which has been generated by the PN_G of the light measuring instrument 17, through the second pseudo-random pattern generator/detector 30 without processing; outputting the PN pattern signal to the outside of the optical transceiver 1 once; inputting the PN pattern signal to the optical transceiver 1 through the loopback electric wiring 20 again; inputting the PN pattern signal to the first pseudo-random pattern generator/detector 25; and checking whether or not there is an error of the PN pattern signal.

It is possible to evaluate and test a path (the second optical fiber 16—the receiving side path 11—the loopback electric wiring 20—the transmitting side path 6—the first optical fiber 15), that is to say, the whole optical transceiver 1 including the optical fiber lines, the optical transceiver implemented substrate 12 by the following: passing the PN pattern signal, which has been generated by the PN_G of the light measuring instrument 17, through the second pseudo-random pattern generator/detector 30 and the first pseudo-random pattern generator/detector 25 without processing; inputting the PN pattern from the transmitting unit 5 to the light measuring instrument 17 through the first optical fiber 15; and checking whether or not there is an error of the PN pattern signal using the PN_C of the light measuring instrument 17.

It is possible to evaluate and test a path (the low-speed parallel output interface 10—the loopback electric wiring 20—the low-speed parallel input interface 2) by the following: outputting the PN pattern signal, which has been generated by the second pseudo-random pattern generator/detector 30, to the outside of the optical transceiver 1; inputting the PN pattern signal to the optical transceiver 1 through the loopback electric wiring 20 again; inputting the PN pattern signal to the first pseudo-random pattern generator/detector 25; and checking whether or not there is an error of the PN pattern signal.

It is possible to evaluate and test a path (the low-speed parallel output interface 10—the loopback electric wiring 20—the low-speed parallel input interface 2—the transmitting unit 5—the first optical fiber 15) by the following: passing the PN pattern signal, which has been generated by the second pseudo-random pattern generator/detector 30, through the first pseudo-random pattern generator/detector 25 without processing; inputting the PN pattern signal from the transmitting unit 5 to the light measuring instrument 17 through the first optical fiber 15; and checking whether or not there is an error of the PN pattern signal using the PN_C of the light measuring instrument 17.

It is possible to evaluate and test a path (the transmitting unit 5—the first optical fiber 15) by the following: inputting the PN pattern signal, which has been generated by the first pseudo-random pattern generator/detector 25, to the transmitting unit 5; inputting the PN pattern signal to the light measuring instrument 17 through the first optical fiber 15; and checking whether or not there is an error of the PN pattern signal using the PN C of the light measuring instrument 17.

It is possible to evaluate and test a path (the multiplexing circuit 3—the first loopback path 31—the demultiplexing circuit 8) by the following: inputting the PN pattern signal, which has been generated by the first pseudo-random pattern generator/detector 25, to the multiplexing circuit 3; inputting the PN pattern signal to the second pseudo-random pattern generator/detector 30 through the first loopback path 31 and the demultiplexing circuit 8; and checking whether or not there is an error of the PN pattern signal.

As described above, according to the thirteenth embodiment, it is possible to perform not only evaluation of the whole optical transceiver 1, the whole transmitting side path 6, and the whole receiving side path 11 but also individual evaluation and testing of each path, which is separated by the light measuring instrument 17 and the first and the second pseudo-random pattern generators/detectors 25 and 30 built into the optical transceiver 1. Therefore, it is possible to realize a method for evaluating and testing the optical transceiver 1, whereby, for example, if there is malfunction, a path having the malfunction can be identified.

(Fourteenth Embodiment)

As regards a diagram illustrating a method for evaluating and testing an optical transceiver according to a fourteenth embodiment of the present invention, the light measuring instrument 17 shown in FIG. 14 according to the thirteenth embodiment is replaced with another optical transceiver 1 that works normally. The transmitting unit 5 of the optical transceiver 1, which is substituted for the light measuring instrument 17, is connected to the receiving unit 9 of the optical transceiver 1, which should be measured, through the second optical fiber 16. The transmitting unit 5 of the optical transceiver 1 to be measured is connected to the receiving unit 9 of the optical transceiver 1, which is substituted for the light measuring instrument 17, through the first optical fiber 15.

In addition, since description of operation is similar to that shown in the thirteenth embodiment, the description will be omitted.

As described above, according to the fourteenth embodiment, it is possible to perform not only evaluation of the whole optical transceiver 1, the whole transmitting side path 6, and the whole receiving side path 11 but also individual evaluation and testing of each path separated by the optical transceiver 1, which is substituted for the light measuring instrument 17, and the first and the second pseudo-random pattern generators/detectors 25 and 30 built into the optical transceiver 1 to be measured. Therefore, the following effect is exhibited: it is possible to realize a method for evaluating and testing the optical transceiver 1, whereby, for example, if there is malfunction, a path having the malfunction can be identified.

Moreover, according to the fourteenth embodiment, by using another optical transceiver that works normally instead of the light measuring instrument 17, a method for evaluating and testing the optical transceiver 1 capable of miniaturizing an evaluation/test system can be realized.

(Fifteenth Embodiment)

Figure 15:
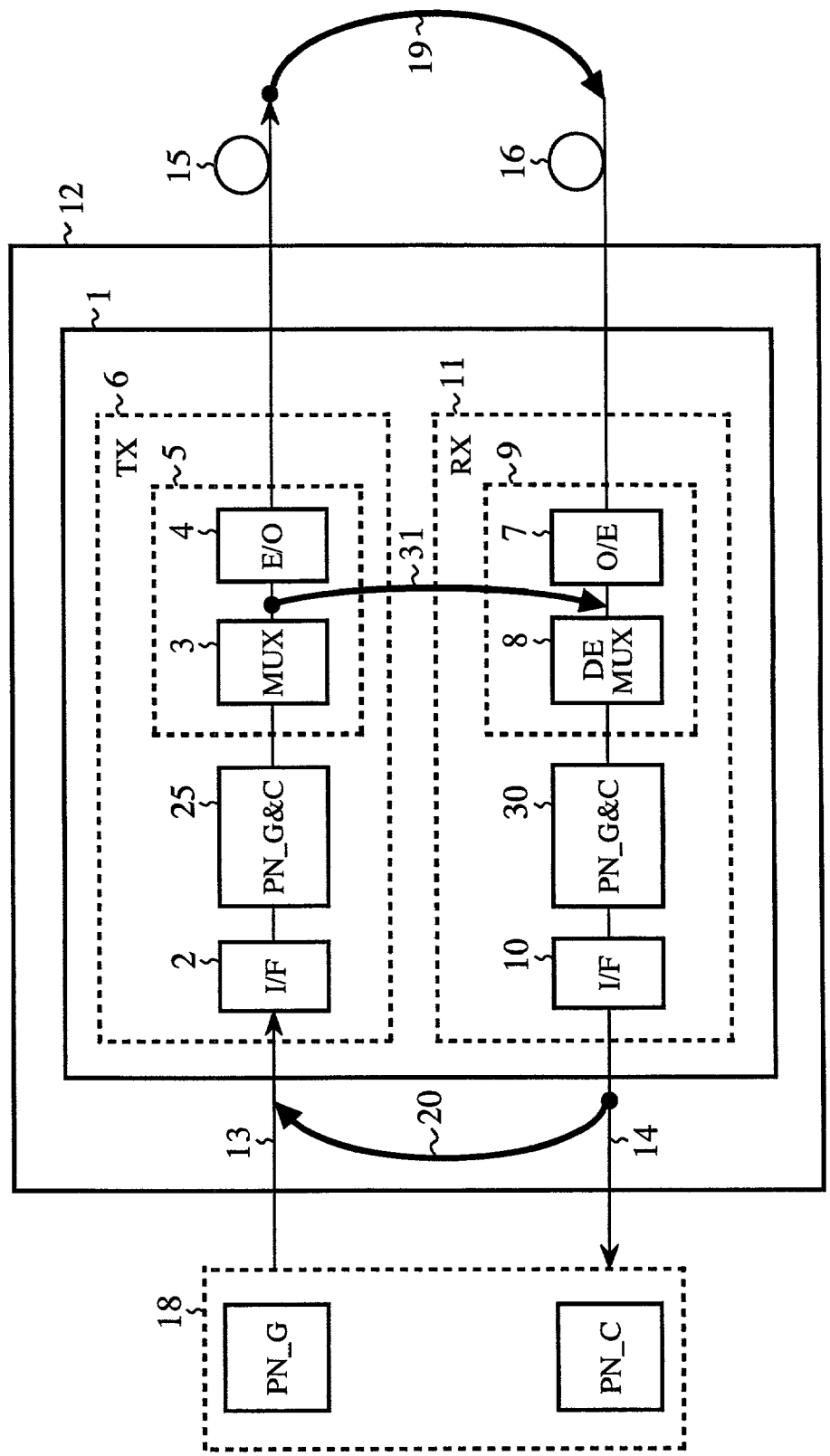
FIG. 15 is a diagram illustrating a method for evaluating and testing an optical transceiver according to a fifteenth embodiment of the present invention.
Figure 21:
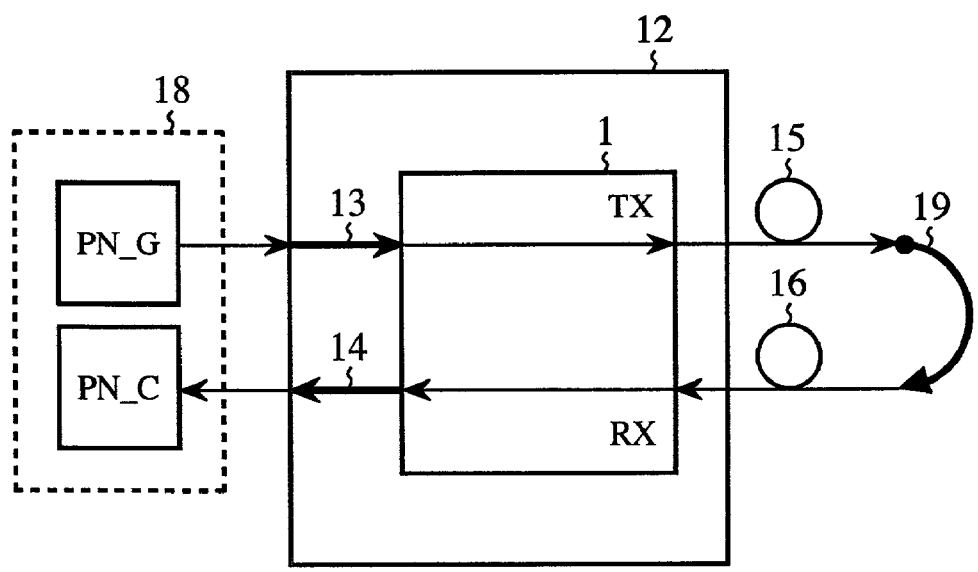
FIG. 21 is a diagram illustrating a method for evaluating and testing the conventional optical transceiver.

FIG. 15 is a diagram illustrating a method for evaluating and testing an optical transceiver according to a fifteenth embodiment of the present invention. A configuration of the optical transceiver 1 shown in FIG. 15 is simplified for illustration. Parts common to those shown in FIGS. 1, 19, and 21 are provided with similar reference numerals and description of the parts will be omitted.

Next, operation will be described.

Since operation of the optical transceiver 1 as a whole is similar to that shown in the first embodiment, description of the operation will be omitted. A PN pattern signal, which has been generated by the PN_G of the electric measuring instrument 18, is inputted to the low-speed parallel input interface 2 of the optical transceiver 1 through the input electric wiring 13. It is possible to evaluate and test a path (the input electric wiring 13—the low-speed parallel input interface 2) by inputting the PN pattern signal to the first pseudo-random pattern generator/detector 25, and checking whether or not there is an error of the PN pattern signal.

In addition, it is possible to evaluate and test a path (the input electric wiring 13—the low-speed parallel input interface 2—the multiplexing circuit 3—the first loopback path 31—the demultiplexing circuit 8) by the following: passing the PN pattern signal, which has been generated by the PN_G of the electric measuring instrument 18, through the first pseudo-random pattern generator/detector 25 without processing; inputting the PN pattern signal to the second pseudo-random pattern generator/detector 30 through the first loopback path 31; and checking whether or not there is an error of the PN pattern signal.

In addition, it is possible to test and evaluate a path (the input electric wiring 13—the low-speed parallel input interface 2—the multiplexing circuit 3—the first loopback path 31—the demultiplexing circuit 8—the low-speed parallel output interface 10—the output electric wiring 14) by the following: passing the PN pattern signal, which has been generated by the PN_G of the electric measuring instrument 18, through the first pseudo-random pattern generator/detector 25 without processing; passing the PN pattern signal through the first loopback path 31; passes the PN pattern signal through the second pseudo-random pattern generator/detector 30 without processing; inputting the PN pattern signal to the electric measuring instrument 18 through the output electric wiring 14; and checking whether or not there is an error of the PN pattern signal using the PN C of the electric measuring instrument 18.

In addition, it is possible to evaluate and test a path (the input electric wiring 13—the transmitting side path 6—the loopback optical fiber 19—the demultiplexing circuit 8) by the following: passing the PN pattern signal, which has been generated by the PN_G of the electric measuring instrument 18, through the first pseudo-random pattern generator/detector 25 without processing; outputting the PN pattern signal to the outside of the optical transceiver 1 from the transmitting unit 5; inputting the PN pattern signal to the optical transceiver 1 again through the loopback optical fiber 19; inputting the PN pattern signal to the second pseudo-random pattern generator/detector 30; and checking whether or not there is an error of the PN pattern signal.

In addition, it is possible to evaluate and test a path (the input electric wiring 13—the transmitting side path 6—the loopback optical fiber 19—the receiving side path 11—the output electric wiring 14), that is to say, the whole optical transceiver 1 including the evaluation/test system and the optical transceiver implemented substrate 12 by the following: passing the PN pattern signal, which has been generated by the PN_G of the electric measuring instrument 18, through the first pseudo-random pattern generator/detector 25 without processing; passing the PN pattern signal through the loopback optical fiber 19; passing the PN pattern signal through the second pseudo-random pattern generator/detector 30 without processing; inputting the PN pattern signal to the electric measuring instrument 18 through the output electric wiring 14; and checking whether or not there is an error of the PN pattern signal using the PN_C of the electric measuring instrument 18.

In addition, it is possible to evaluate and test a path (the multiplexing circuit 3—the first loopback path 31—the demultiplexing circuit 8) by the following: inputting the PN pattern signal, which has been generated by the first pseudo-random pattern generator/detector 25, to the second pseudo-random pattern generator/detector 30 through the multiplexing circuit 3, the first loopback path 31, and the demultiplexing circuit 8; and checking whether or not there is an error of the PN pattern signal.

In addition, it is possible to evaluate and test a path (the multiplexing circuit 3—the first loopback path 31—the demultiplexing circuit 8—the low-speed parallel output interface 10—the output electric wiring 14) by the following: inputting the PN pattern signal, which has been generated by the first pseudo-random pattern generator/detector 25, to the demultiplexing circuit 8 through the multiplexing circuit 3 and the first loopback path 31; passing the PN pattern signal through the second pseudo-random pattern generator/detector 30 without processing; inputting the PN pattern signal to the electric measuring instrument 18 through the output electric wiring 14; and checking whether or not there is an error of the PN pattern signal using the PN_C of the electric measuring instrument 18.

In addition, it is possible to evaluate and test a path (the transmitting unit 5—the loopback optical fiber 19—the receiving unit 9) by the following: outputting the PN pattern signal, which has been generated by the first pseudo-random pattern generator/detector 25, to the outside of the optical transceiver 1 from the transmitting unit 5; inputting the PN pattern signal to the receiving unit 9 again through the loopback optical fiber 19; inputting the PN pattern signal to the second pseudo-random pattern generator/detector 30; and checking whether or not there is an error of the PN pattern signal.

In addition, it is possible to evaluate and test a path (the transmitting unit 5—the loopback optical fiber 19—the receiving side path 11—the output electric wiring 14) by the following: outputting the PN pattern signal, which has been generated by the first pseudo-random pattern generator/detector 25, to the outside of the optical transceiver 1 from the transmitting unit 5; inputting the PN pattern signal to the receiving unit 9 again through the loopback optical fiber 19; passing the PN pattern signal through the second pseudo-random pattern generator/detector 30 without processing; inputting the PN pattern signal to the electric measuring instrument 18 through the output electric wiring 14; and checking whether or not there is an error of the PN pattern signal using the PN_C of the electric measuring instrument 18.

In addition, it is possible to evaluate and test a path (the low-speed parallel output interface 10—the output electric wiring 14) by the following: inputting the PN pattern signal, which has been generated by the second pseudo-random pattern generator/detector 30, to the electric measuring instrument 18 through the output electric wiring 14; and checking whether or not there is an error of the PN pattern signal using the PN_C of the electric measuring instrument 18.

In addition, it is possible to evaluate and test a path (the low-speed parallel output interface 10—the loopback electric wiring 20—the low-speed parallel input interface 2) by the following: outputting the PN pattern signal, which has been generated by the second pseudo-random pattern generator/detector 30, from the low-speed parallel output interface 10; inputting the PN pattern signal to the first pseudo-random pattern generator/detector 25 through the loopback electric wiring 20 and the low-speed parallel input interface 2; and checking whether or not there is an error of the PN pattern signal.

As described above, according to the fifteenth embodiment, it is possible to perform not only evaluation of the whole optical transceiver 1, the whole transmitting side path 6, and the whole receiving side path 11 but also individual evaluation and testing of each path, which is separated by the electric measuring instrument 18 and the first and the second pseudo-random pattern generators/detectors 25 and 30 built into the optical transceiver 1. Therefore, it is possible to realize a method for evaluating and testing the optical transceiver 1, whereby, for example, if there is malfunction, a path having the malfunction can be identified.

(Sixteenth Embodiment)

As regards a diagram illustrating a method for evaluating and testing an optical transceiver according to a sixteenth embodiment of the present invention, the electric measuring instrument 18 shown in FIG. 15 according to the fifteenth embodiment is replaced with another optical transceiver 1 that works normally. The low-speed parallel output interface 10 of the optical transceiver 1, which is substituted for the electric measuring instrument 18, is connected to the optical transceiver 1, which should be measured, through the input electric wiring 13. The low-speed parallel output interface 10 of the optical transceiver 1 to be measured is connected to the optical transceiver 1, which is substituted for the electric measuring instrument 18, through the output electric wiring 14.

In addition, since description of operation is similar to that shown in the fifteenth embodiment, the description will be omitted.

As described above, according to the sixteenth embodiment, it is possible to perform not only evaluation of the whole optical transceiver 1, the whole transmitting side path 6, and the whole receiving side path 11 but also individual evaluation and testing of each path separated by the optical transceiver 1, which is substituted for the electric measuring instrument 18, and the first and the second pseudo-random pattern generators/detectors 25 and 30 built into the optical transceiver 1 to be measured. Therefore, it is possible to realize a method for evaluating and measuring the optical transceiver 1, whereby, for example, if there is malfunction, a path having the malfunction can be identified.

Moreover, according to the sixteenth embodiment, by using another optical transceiver that works normally instead of the electric measuring instrument 18, the evaluation/test system can be miniaturized.

(Seventeenth Embodiment)

Figure 16:
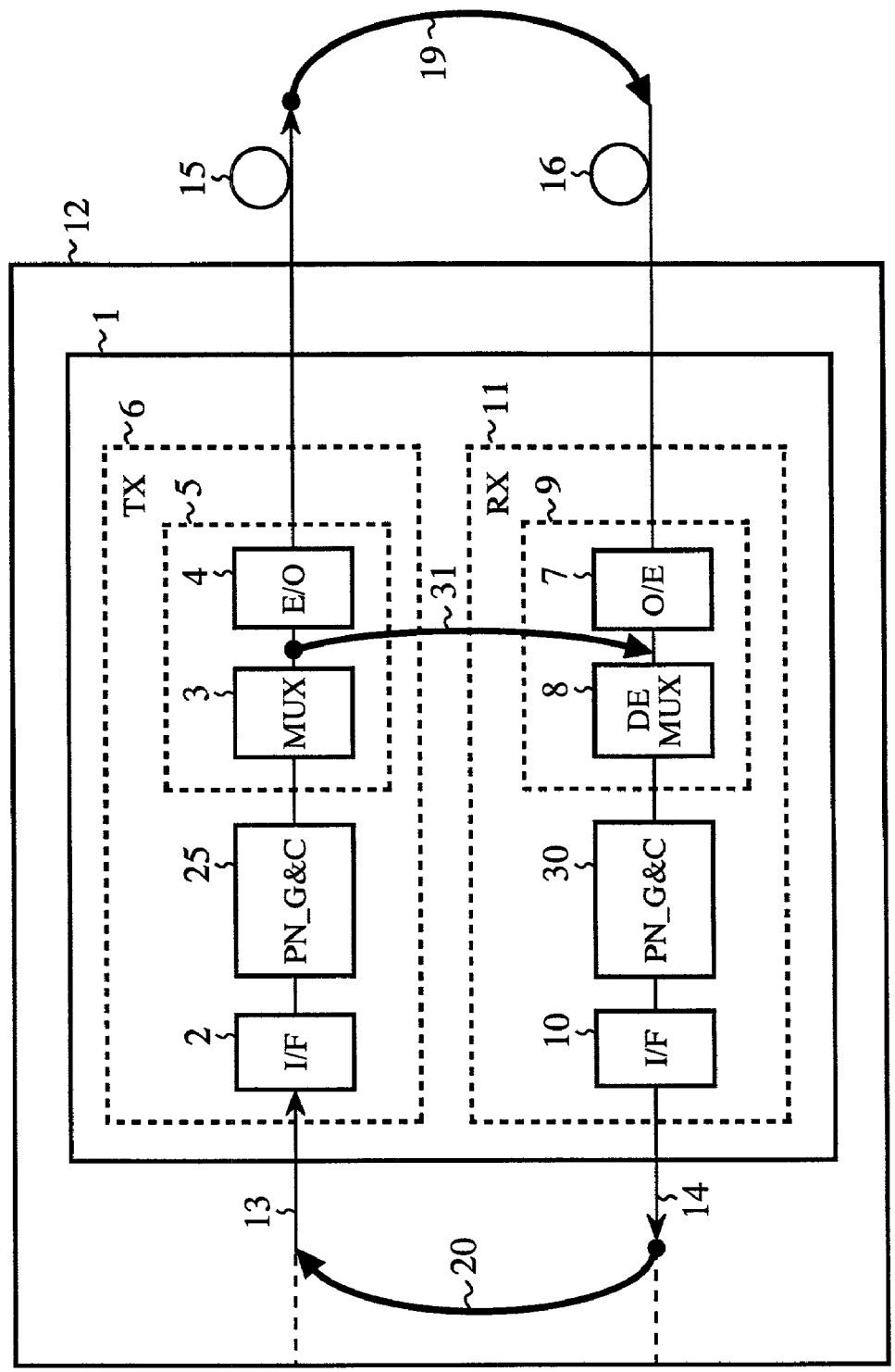
FIG. 16 is a diagram illustrating a method for evaluating and testing an optical transceiver according to a seventeenth embodiment of the present invention.

FIG. 16 is a diagram illustrating a method for evaluating and testing an optical transceiver according to a seventeenth embodiment of the present invention. A configuration of the optical transceiver 1 shown in FIG. 16 is simplified for illustration. Parts common to those shown in FIGS. 1, 19, 21, and 22 are provided with similar reference numerals and description of the parts will be omitted.

Next, operation will be described.

Since operation of the optical transceiver 1 as a whole is similar to that shown in the first embodiment, description of the operation will be omitted. It is possible to evaluate and test a path (the multiplexing circuit 3—the first loopback path 31—the demultiplexing circuit 8) by the following: inputting the PN pattern signal, which has been generated by the first pseudo-random pattern generator/detector 25, to the second pseudo-random pattern generator/detector 30 through the multiplexing circuit 3, the first loopback path 31, and the demultiplexing circuit 8; and checking whether or not there is an error of the PN pattern signal.

In addition, it is possible to evaluate and test a path (the transmitting unit 5—the loopback optical fiber 19—the receiving unit 9) by the following: outputting the PN pattern signal, which has been generated by the first pseudo-random pattern generator/detector 25, to the outside of the optical transceiver 1 from the transmitting unit 5; inputting the PN pattern signal to the receiving unit 9 again through the loopback optical fiber 19; inputting the PN pattern signal to the second pseudo-random pattern generator/detector 30; and checking whether or not there is an error of the PN pattern signal.

In addition, it is possible to evaluate and test a path (the transmitting unit 5—the loopback optical fiber 19—the receiving side path 11—the loopback electric wiring 20—the low-speed parallel input interface 2), that is to say, the whole optical transceiver 1 including the evaluation/test system and the optical transceiver implemented substrate 12 by the following: outputting the PN pattern signal, which has been generated by the first pseudo-random pattern generator/detector 25, to the outside of the optical transceiver 1 from the transmitting unit 5; inputting the PN pattern signal to the receiving unit 9 again through the loopback optical fiber 19; passing the PN pattern signal through the second pseudo-random pattern generator/detector 30 without processing; inputting the PN pattern signal to the low-speed parallel input interface 2 through the output electric wiring 14; inputting the PN pattern signal to the first pseudo-random pattern generator/detector 25; and checking the PN pattern signal for a possible error.

However, if the first pseudo-random pattern generator/detector 25 described in the fourth and fifth embodiments is used, one pseudo-random pattern generator/detector cannot generate and detect a pseudo-random pattern simultaneously. Therefore, it is not possible to evaluate and test a path (the transmitting unit 5—the loopback optical fiber 19—the receiving side path 11—the loopback electric wiring 20—the low-speed parallel input interface 2).

In addition, it is possible to evaluate and test a path (the low-speed parallel output interface 10—the loopback electric wiring 20—the low-speed parallel input interface 2) by the following: outputting the PN pattern signal, which has been generated by the second pseudo-random pattern generator/detector 30, from the low-speed parallel output interface 10; inputting the PN pattern signal to the low-speed parallel input interface 2 again through the loopback electric wiring 20; inputting the PN pattern signal to the first pseudo-random pattern generator/detector 25; and checking whether or not there is an error of the PN pattern signal.

In addition, it is possible to evaluate and test a path (the low-speed parallel output interface 10—the loopback electric wiring 20—the low-speed parallel input interface 2—the multiplexing circuit 3—the first loopback path 31 the demultiplexing circuit 8) by the following: inputting the PN pattern signal, which has been generated by the second pseudo-random pattern generator/detector 30, to the low-speed parallel input interface 2 through the loopback electric wiring 20; passing the PN pattern signal through the first pseudo-random pattern generator/detector 25 without processing; inputting the PN pattern signal to the second pseudo-random pattern generator/detector 30 through the multiplexing circuit 3, the first loopback path 31, and the demultiplexing circuit 8; and checking the PN pattern signal for a possible error.

In addition, it is possible to evaluate and test a path (the low-speed parallel output interface 10—the loopback electric wiring 20—the transmitting side path 6 —the loopback optical fiber 19—the receiving unit 9), that is to say, the whole optical transceiver 1 including the evaluation/test system and the optical transceiver substrate 12 by the following: inputting the PN pattern signal, which has been generated by the second pseudo-random pattern generator/detector 30, to the low-speed parallel input interface 2 through the loopback electric wiring 20; passing the PN pattern signal through the first pseudo-random pattern generator/detector 25 without processing; outputting the PN pattern signal to the outside of the optical transceiver 1 from the transmitting unit 5; inputting the PN pattern signal to the receiving unit 9 through the loopback optical fiber 19; inputting the PN pattern signal to the second pseudo-random pattern generator/detector 30; and checking whether or not there is an error of the PN pattern signal.

However, if the second pseudo-random pattern generator/detector 30 described in the fourth and fifth embodiments is used, one pseudo-random pattern generator/detector cannot generate and detect a pseudo-random pattern simultaneously. Therefore, it is not possible to evaluate and test a path (the low-speed parallel output interface 10—the loopback electric wiring 20—the low-speed parallel input interface 2—the multiplexing circuit 3—the first loopback path 31—the demultiplexing circuit 8) or a path (the low-speed parallel output interface 10—the loopback electric wiring 20—the transmitting side path 6—the loopback optical fiber 19—the receiving unit 9).

As described above, according to the seventeenth embodiment, it is possible to perform not only evaluation of the whole optical transceiver 1, the whole transmitting side path 6, and the whole receiving side path 11 but also individual evaluation and testing of each path, which is separated by the first and the second pseudo-random pattern generators/detectors 25 and 30 built into the optical transceiver 1. Therefore, the following effect is exhibited: it is possible to realize a method for evaluating and testing the optical transceiver 1, whereby, for example, if there is malfunction, a path having the malfunction can be identified.

Moreover, according to the seventeenth embodiment, because the optical transceiver 1, which is evaluated, can perform evaluation and testing singly for itself, an effect of achieving miniaturization of the evaluation/test system is exhibited.

(Eighteenth Embodiment)

Figure 17:
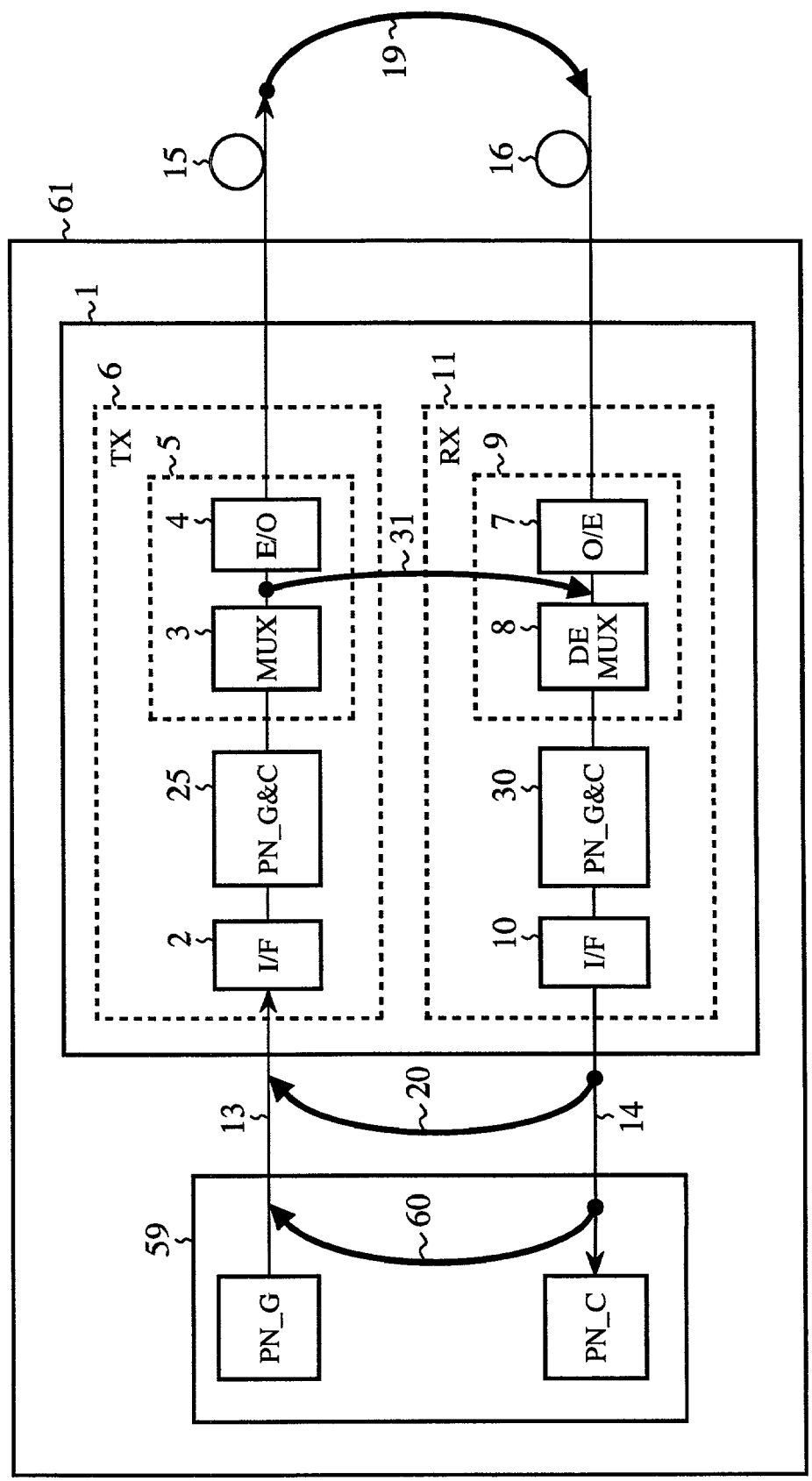
FIG. 17 is a diagram illustrating a method for evaluating and testing an optical transceiver, and a method for evaluating and testing connection between the optical transceiver and a framer circuit, according to an eighteenth embodiment of the present invention.

FIG. 17 is a diagram illustrating a method for evaluating and testing an optical transceiver, and a method for evaluating and testing connection between the optical transceiver and a framer circuit, according to an eighteenth embodiment of the present invention. A configuration of the optical transceiver 1 shown in FIG. 17 is simplified for illustration. Parts common to those shown in FIGS. 1, 19, 21, and 22 are provided with similar reference numerals and description of the parts will be omitted.

In FIG. 17, reference numeral 59 denotes a framer circuit that generates a frame pattern in a given format for transmission and reception; 60 denotes a third loopback path that loops back from an input portion of the framer circuit 59 to an output portion; and 61 denotes an interface substrate for implementing and connecting the optical transceiver 1 and the framer circuit 59. The interface substrate 61 comprises an input electric wiring 13 for a signal inputted to the optical transceiver 1; an output electric wiring 14; and a loopback electric wiring 20 that loops back from the output electric wiring 14 to the input electric wiring 13.

Next, operation will be described.

Since evaluation and testing of the optical transceiver 1 as a unit are similar to those shown in the seventeenth embodiment, description of the evaluation and testing will be omitted.

Next, evaluation and testing of connection between the framer circuit 59 and the optical transceiver 1 will be described. For example, if the framer circuit 59 has PN_G and PN_C, it is possible to evaluate and test a path (the framer circuit 59—the input electric wiring 13—the low-speed parallel input interface 2) by the following: inputting the PN pattern signal, which has been generated by the PN_G of the framer circuit 59, to the optical transceiver 1; and in the first pseudo-random pattern generator/detector 25, checking whether or not there is an error of the PN pattern signal.

In addition, it is possible to evaluate and test a path (the framer circuit 59—the input electric wiring 13—the low-speed parallel input interface 2—the multiplexing circuit 3—the first loopback path 31—the demultiplexing circuit 8) by the following: passing the PN pattern signal, which has been generated by the PN_G of the framer circuit 59, through the first pseudo-random pattern generator/detector 25 without processing; through the multiplexing circuit 3, the first loopback path 31, and the demultiplexing circuit 8, and in the second pseudo-random pattern generator/detector 30, checking whether or not there is an error of the PN pattern signal.

In addition, it is possible to evaluate and test a path (the framer circuit 59—the input electric wiring 13—the low-speed parallel input interface 2—the multiplexing circuit 3—the first loopback path 31—the demultiplexing circuit 8—the low-speed parallel output interface 10—the output electric wiring 14—the framer circuit 59) by the following: passing the PN pattern signal, which has been generated by the PN_G of the framer circuit 59, through the first pseudo-random pattern generator/detector 25 without processing; inputting the PN pattern signal to the demultiplexing circuit 8 through the multiplexing circuit 3 and the first loopback path 31; passing the PN pattern signal through the second pseudo-random pattern generator/detector 30 without processing; outputting the PN pattern signal from the optical transceiver 1; and checking whether or not there is an error of the PN pattern signal using the PN_C of the framer circuit 59.

In addition, evaluation and testing can be performed using a path (the framer circuit 59—the input electric wiring 13—the transmitting side path 6—the loopback optical fiber 19—the receiving side path 11—the output electric wiring 14—the framer circuit 59) by the following: passing the PN pattern signal, which has been generated by the PN_G of the framer circuit 59, through the first pseudo-random pattern generator/detector 25 without processing; inputting the PN pattern signal to the receiving unit 9 through the transmitting unit 5 and the loopback optical fiber 19; passing the PN pattern signal through the second pseudo-random pattern generator/detector 30 without processing; outputting the PN pattern signal from the optical transceiver 1; and checking whether or not there is an error of the PN pattern signal using the PN_C of the framer circuit 59.

Figure 18:
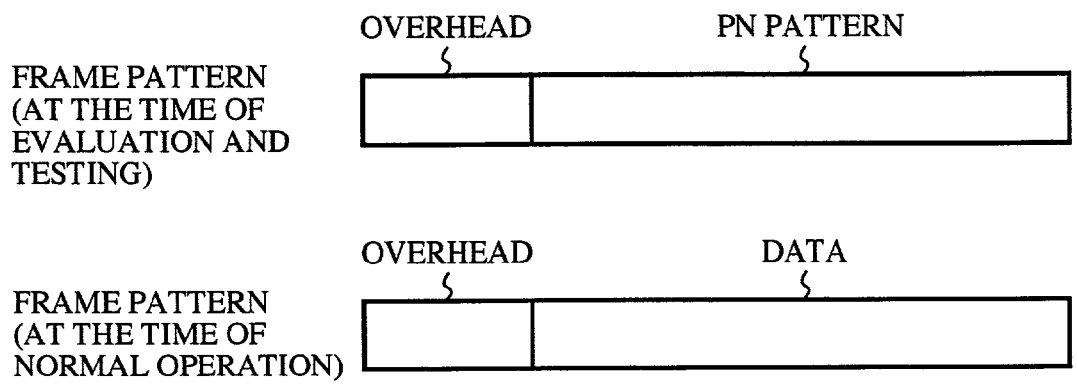
FIG. 18 is a diagram illustrating a frame pattern generated by a framer circuit.

FIG. 18 is a diagram illustrating a frame pattern generated by the framer circuit 59. For example, as shown in FIG. 18, if the framer circuit 59 builds a PN pattern signal into the frame pattern and generates and detects the frame pattern with the built-in PN pattern signal, the first and the second pseudo-random pattern generators/detectors 25 and 30, which are built into the optical transceiver 1, cannot perform detection. Because of it, the frame pattern with the built-in PN pattern signal is passed through the first pseudo-random pattern generator/detector 25 and the second pseudo-random pattern generator/detector 30 without processing before the frame pattern with the built-in PN pattern signal is evaluated and tested.

In other words, by passing the frame pattern through the loopback optical fiber 19 or the first loopback path 31, evaluation and testing can be performed using a path (the framer circuit 59—the input electric wiring 13—the low-speed parallel input interface 2—the multiplexing circuit 3—the first loopback path 31—the demultiplexing circuit 8—the low-speed parallel output interface 10—the output electric wiring 14—the framer circuit 59), or a path (the framer circuit 59—the input electric wiring 13—the transmitting side path 6—the loopback optical fiber 19—the receiving side path 11—the output electric wiring 14—the framer circuit 59).

In addition, if the framer circuit 59 does not have PN_G and PN_C, it is possible to evaluate and test a path (the low-speed parallel output interface 10—the output electric wiring 14—the third loopback path 60 in the framer circuit 59—the input electric wiring 13—the low-speed parallel input interface 2) by the following: inputting the PN pattern signal, which has been generated by the second pseudo-random pattern generator/detector 30, to the framer circuit 59 through the output electric wiring 14; inputting the PN pattern signal to the optical transceiver 1 again through the third loopback path 60 and the input electric wiring 13; and in the first pseudo-random pattern generator/detector 25, checking whether or not there is an error of the PN pattern signal.

As described above, according to the eighteenth embodiment, it is possible to perform not only evaluation of the whole optical transceiver 1, the whole transmitting side path 6, and the whole receiving side path 11 but also individual evaluation and testing of each path, which is separated by the framer circuit 59 and the first and the second pseudo-random pattern generators/detectors 25 and 30 built into the optical transceiver 1. Therefore, the following effect is exhibited: it is possible to realize a method for evaluating and testing the optical transceiver 1, whereby, for example, if there is malfunction, a path having the malfunction can be identified.

Moreover, according to the eighteenth embodiment, since the optical transceiver 1, which is evaluated, can perform evaluation and testing singly for itself, an effect of achieving miniaturization of the evaluation/test system is exhibited.

In addition, according to the eighteenth embodiment, since the framer circuit 59 is connected, the following effect is exhibited: connection between the framer circuit 59 and the optical transceiver 1 can be evaluated and tested simultaneously.

As described above, according to the present invention, in the transmitting side path, the optical transceiver comprises the first pseudo-random pattern generator and the first pseudo-random pattern detector. In the receiving side path, the optical transceiver comprises the second pseudo-random pattern generator and the second pseudo-random pattern detector. In addition to them, the optical transceiver comprises the first loopback path that transmits a pseudo-random pattern signal from the transmitting side path to the receiving side path; and the second loopback path that transmits a pseudo-random pattern signal from the receiving side path to the transmitting side path. Therefore, the following effects are exhibited: not only evaluation and testing of the whole optical transceiver, the transmitting side path, and the receiving side path, but also evaluation and testing of individual parts inside the optical transceiver become possible; and this enables identification of a malfunction path if malfunction occurs in the optical transceiver.

According to the present invention, in the transmitting side path, the optical transceiver comprises the first selector that selects an electric signal from the input interface or a pseudo-random pattern signal from the first pseudo-random pattern generator, and that outputs the electric signal or the pseudo-random pattern signal to the first pseudo-random pattern detector; and in the receiving side path, the optical transceiver comprises the second selector that selects an electric signal from the demultiplexing circuit or a pseudo-random pattern signal from the second pseudo-random pattern generator, and that outputs the electric signal or the pseudo-random pattern signal to the second pseudo-random pattern detector. Therefore, the following effects are exhibited: not only evaluation and testing of the whole optical transceiver, the transmitting side path, and the receiving side path, but also evaluation and testing of individual parts inside the optical transceiver become possible; and this enables identification of a malfunction path if malfunction occurs in the optical transceiver.

According to the present invention, in the transmitting side path, the optical transceiver comprises the first selector that selects an electric signal from the input interface or a pseudo-random pattern signal from the first pseudo-random pattern generator; and the third selector that selects the electric signal from the input interface or an output of the first selector, and that outputs the electric signal or the output of the first selector to the first pseudo-random pattern detector. In the receiving side path, the optical transceiver comprises the second selector that selects an electric signal from the demultiplexing circuit or a pseudo-random pattern signal from the second pseudo-random pattern generator; and the fourth selector that selects the electric signal from the demultiplexing circuit or an output of the second selector, and that outputs the electric signal or the output of the second selector to the second pseudo-random pattern detector. Therefore, the following effects are exhibited: not only evaluation and testing of the whole optical transceiver, the transmitting side path, and the receiving side path, but also evaluation and testing of individual parts inside the optical transceiver become possible; this enables identification of a malfunction path if malfunction occurs in the optical transceiver; and this also enables selection as to whether or not the first selector and the second selector should be included in a path to be evaluated.

According to the present invention, the first integral pseudo-random pattern generator/detector is configured as one circuit comprising the first pseudo-random pattern generator and the first pseudo-random pattern detector; and the second integral pseudo-random pattern generator/detector is configured as one circuit comprising the second pseudo-random pattern generator and the second pseudo-random pattern detector. Therefore, an effect of realizing the optical transceiver with a reduced circuit size and low power consumption is exhibited.

According to the present invention, the first and the second integral pseudo-random pattern generators/detectors input a pseudo-random pattern signal, which has been inputted, as an initial value to generate a pseudo-random pattern signal for error detection and comparison. Pseudo-random pattern detection is performed by comparing the generated pseudo-random pattern signal for error detection and comparison with the inputted pseudo-random pattern signal. Pseudo-random pattern generation is performed by generating a pseudo-random pattern signal using a given initialization signal, or by generating the pseudo-random pattern signal by inputting the inputted pseudo-random pattern signal as an initial value. Therefore, effects of reducing a circuit size and achieving low power consumption are exhibited.

According to the present invention, the input interface, the first pseudo-random pattern generator, the first pseudo-random pattern detector, and the multiplexing circuit are integrated into the multiplexing integrated circuit; and the demultiplexing circuit, the second pseudo-random pattern generator, the second pseudo-random pattern detector, and the output interface are integrated into the demultiplexing integrated circuit. Therefore, the following effects are exhibited: not only evaluation and testing of the whole optical transceiver, the transmitting side path, and the receiving side path, but also evaluation and testing of individual parts inside the optical transceiver, inside the multiplexing integrated circuit, and inside the demultiplexing integrated circuit become possible; and this enables identification of a malfunction path if malfunction occurs in the optical transceiver.

According to the present invention, the input interface, the first pseudo-random pattern generator, the first pseudo-random pattern detector, the multiplexing circuit, the demultiplexing circuit, the second pseudo-random pattern generator, the second pseudo-random pattern detector, the output interface, and the first loopback path are integrated into one unit to constitute the integral multiplexing/demultiplexing integrated circuit. Therefore, the following effects are exhibited: not only evaluation and testing of the whole optical transceiver, the transmitting side path, and the receiving side path, but also evaluation and testing of individual parts inside the optical transceiver, and inside the integral multiplexing/demultiplexing integrated circuit become possible; and this enables identification of a malfunction path if malfunction occurs in the optical transceiver.

According to the present invention, the multiplexing integrated circuit comprises the input interface, the multiplexing circuit, the pseudo-random pattern generator, and the pseudo-random pattern detector. Therefore, the following effect is exhibited: it is possible to evaluate and test paths inside the multiplexing integrated circuit individually.

According to the present invention, the integral pseudo-random pattern generator/detector is configured as one circuit comprising the pseudo-random pattern generator and the pseudo-random pattern detector, which are in the multiplexing integrated circuit. Therefore, effects of reducing a circuit size and achieving low power consumption are exhibited.

According to the present invention, the demultiplexing integrated circuit comprises the demultiplexing circuit, the output interface, the pseudo-random pattern generator, and the pseudo-random pattern detector. Therefore, it is possible to evaluate and test paths inside the demultiplexing integrated circuit individually.

According to the present invention, the integral pseudo-random pattern generator/detector is configured as one circuit comprising the pseudo-random pattern generator and the pseudo-random pattern detector, which are in the demultiplexing integrated circuit. Therefore, effects of reducing a circuit size and achieving low power consumption are exhibited.

According to the present invention, the integral multiplexing/demultiplexing integrated circuit comprises: the multiplexing portion comprising the input interface, the multiplexing circuit, the first pseudo-random pattern generator, and the first pseudo-random pattern detector; the demultiplexing portion comprising the demultiplexing circuit, the output interface, the second pseudo-random pattern generator, and the second pseudo-random pattern detector; the loopback path that transmits the pseudo-random pattern signal from the multiplexing circuit to the demultiplexing circuit. Therefore, it is possible to evaluate and test paths inside the integral multiplexing/demultiplexing integrated circuit individually.

According to the present invention, the first integral pseudo-random pattern generator/detector is configured as one circuit comprising the first pseudo-random pattern generator and the first pseudo-random pattern detector, which are in the integral multiplexing/demultiplexing integrated circuit; and the second integral pseudo-random pattern generator/detector is configured as one circuit comprising the second pseudo-random pattern generator and the second pseudo-random pattern detector. Therefore, effects of reducing a circuit size and achieving low power consumption are exhibited.

According to the present invention, in a method for evaluating and testing an optical transceiver, the optical transceiver comprising:
  a transmitting side path comprising a first pseudo-random pattern generator, and a first pseudo-random pattern detector;
  a receiving side path comprising a second pseudo-random pattern generator, and a second pseudo-random pattern detector;
  a first loopback path, which transmits a pseudo-random pattern signal from the transmitting side path to the receiving side path; and
  a second loopback path, which transmits a pseudo-random pattern signal from the receiving side path to the transmitting side path;
  the method for evaluating and testing the optical transceiver is characterized by the following:
  the optical transceiver is placed on an implementation substrate;
  a loopback electric wiring is placed on the implementation substrate so as to loop back from an output electric wiring on the implementation substrate, which is connected to an output interface, to an input electric wiring on the implementation substrate, which is connected to an input interface;
  an output of an electricity-light converter is connected to an outside pseudo-random pattern detecting function through a first optical fiber; and
  an input of a light-electricity converter is connected to an outside pseudo-random pattern generating function through a second optical fiber.

Therefore, the following effects are exhibited: it is possible to perform not only evaluation of the whole optical transceiver, the whole transmitting side path, and the whole receiving side path, but also individual evaluation and testing of each path, which is separated by the outside pseudo-random pattern detecting function, the pseudo-random pattern generating function, and the first and the second pseudo-random pattern generators/detectors built into the optical transceiver; whereby a path, in which malfunction has occurred, can be identified.

According to the present invention, using another optical transceiver, which works normally, as an outside pseudo-random pattern detecting function and a pseudo-random pattern generating function exhibits an effect of realizing a method for evaluating and testing the optical transceiver by which an evaluation/test system can be miniaturized.

According to the present invention, in a method for evaluating and testing an optical transceiver, the optical transceiver comprising:
  a transmitting side path comprising a first pseudo-random pattern generator, and a first pseudo-random pattern detector;
  a receiving side path comprising a second pseudo-random pattern generator, and a second pseudo-random pattern detector; and
  a loopback path that transmits a pseudo-random pattern signal from a multiplexing circuit of the transmitting side path to a demultiplexing circuit of the receiving side path;
  the method for evaluating and testing the optical transceiver is characterized by the following:
  the optical transceiver is placed on an implementation substrate;
  a loopback electric wiring is placed on the implementation substrate so as to loop back from an output electric wiring on the implementation substrate, which is connected to an output interface, to an input electric wiring on the implementation substrate, which is connected to an input interface;

a loopback optical fiber, which is used for transmitting a pseudo-random pattern signal from a first optical fiber connected to an output of an electricity-light converter to a second optical fiber connected to an input of a light-electricity converter, is connected;

the input electric wiring on the implementation substrate is connected to an outside pseudo-random pattern generating function; and the output electric wiring on the implementation substrate is connected to an outside pseudo-random pattern detecting function.

Therefore, the following effects are exhibited: it is possible to perform not only evaluation of the whole optical transceiver, the whole transmitting side path, and the whole receiving side path, but also individual evaluation and testing of each path, which is separated by the outside pseudo-random pattern generating function, the pseudo-random pattern detecting function, and the first and the second pseudo-random pattern generators/detectors built into the optical transceiver; whereby it is possible to realize a method for evaluating and measuring the optical transceiver. Consequently, a path where malfunction occurs can be identified.

According to the present invention, by using another optical transceiver, which works normally, as an outside pseudo-random pattern detecting function and a pseudo-random pattern generating function, an effect of achieving miniaturization of an evaluation/test system can be exhibited.

According to the present invention, in a method for evaluating and testing an optical transceiver, the optical transceiver comprising:

a transmitting side path comprising a first pseudo-random pattern generator, and a first pseudo-random pattern detector;

a receiving side path comprising a second pseudo-random pattern generator, and a second pseudo-random pattern detector; and a loopback path that transmits a pseudo-random pattern signal from a multiplexing circuit of the transmitting side path to a demultiplexing circuit of the receiving side path;

the method for evaluating and testing the optical transceiver is characterized by the following:

the optical transceiver is placed on an implementation substrate;

a loopback electric wiring is placed on the implementation substrate so as to loop back from an output electric wiring on the implementation substrate, which is connected to an output interface, to an input electric wiring on the implementation substrate, which is connected to an input interface; and a loopback optical fiber, which is used for transmitting a pseudo-random pattern signal from a first optical fiber connected to an output of an electricity-light converter to a second optical fiber connected to an input of a light-electricity converter, is connected.

Therefore, the following effects are exhibited: it is possible to perform not only evaluation of the whole optical transceiver, the whole transmitting side path, and the whole receiving side path, but also individual evaluation and testing of each path, which is separated by the first and the second pseudo-random pattern generators/detectors built into the optical transceiver; whereby it is possible to realize a method for evaluating and measuring the optical transceiver. Consequently, a path where malfunction occurs can be identified; in addition, since the optical transceiver, which is evaluated, can perform evaluation and testing singly for itself, it is possible to achieve miniaturization of an evaluation/test system.

According to the present invention, the pseudo-random pattern generating function of the framer circuit is connected to the input electric wiring; and the pseudo-random pattern detecting function of the framer circuit is connected to the output electric wiring. Therefore, the following effects are exhibited: it is possible to perform not only evaluation of the whole optical transceiver, the whole transmitting side path, and the whole receiving side path, but also individual evaluation and testing of each path, which is separated by the framer circuit and the first and the second pseudo-random pattern generators/detectors built into the optical transceiver: whereby, it is possible to realize a method for evaluating and measuring the optical transceiver. Consequently, a path where malfunction occurs can be identified, and in addition, connection between the framer circuit and the optical transceiver can be evaluated and tested simultaneously.

What is claimed is:

1. An optical transceiver comprising:
   a transmitting side path including:
      an input interface for inputting an electric signal;
      a multiplexing circuit for time-multiplexing the inputted electric signal; and
      an electricity-light converter for converting the time-multiplexed electric signal into a light signal; and
   a receiving side path including:
      a light-electricity converter for converting an inputted light signal into an electric signal;
      a demultiplexing circuit for demultiplexing the converted electric signal; and
      an output interface for outputting the demultiplexed electric signal;
   wherein, in the transmitting side path, said optical transceiver comprises:
   a first pseudo-random pattern generator for generating a pseudo-random pattern signal, and for outputting the pseudo-random pattern signal to the multiplexing circuit; and
   a first pseudo-random pattern detector for evaluating the pseudo-random pattern signal, which has been inputted to the transmitting side path through the input interface;
   in the receiving side path, said optical transceiver comprises:
   a second pseudo-random pattern generator for generating a pseudo-random pattern signal, and for outputting the pseudo-random pattern signal to the output interface; and
   a second pseudo-random pattern detector for evaluating the pseudo-random pattern signal, which has been inputted to the receiving side path through the demultiplexing circuit; and
   said optical transceiver further comprising:
   a first loopback path that transmits the pseudo-random pattern signal from the multiplexing circuit of the transmitting side path to the demultiplexing circuit of the receiving side path; and
   a second loopback path that transmits the pseudo-random pattern signal from the light-electricity converter of the receiving side path to the electricity-light converter of the transmitting side path.

2. An optical transceiver according to claim 1, further comprising:
in the transmitting side path, a first selector that selects an electric signal from the input interface or a pseudo-random pattern signal from the first pseudo-random pattern generator, and that outputs the electric signal or the pseudo-random pattern signal to the first pseudo-random pattern detector; and
in the receiving side path, a second selector that selects an electric signal from the demultiplexing circuit or a pseudo-random pattern signal from the second pseudo-random pattern generator, and that outputs the electric signal or the pseudo-random pattern signal to the second pseudo-random pattern detector.

3. An optical transceiver according to claim 1, further comprising:
in the transmitting side path, a first selector that selects an electric signal from the input interface or a pseudo-random pattern signal from the first pseudo-random pattern generator; and
a third selector that selects an electric signal from the input interface or an output of the first selector, and that outputs the electric signal or the output of the first selector to the first pseudo-random pattern detector; and
in the receiving side path, a second selector that selects an electric signal from the demultiplexing circuit or a pseudo-random pattern signal from the second pseudo-random pattern generator; and
a fourth selector that selects an electric signal from the demultiplexing circuit or an output of the second selector, and that outputs the electric signal or the output of the second selector to the second pseudo-random pattern detector.

4. An optical transceiver according to claim 1, wherein:
a first integral pseudo-random pattern generator/detector is configured as one circuit comprising the first pseudo-random pattern generator and the first pseudo-random pattern detector; and
a second integral pseudo-random pattern generator/detector is configured as one circuit comprising the second pseudo-random pattern generator and the second pseudo-random pattern detector.

5. An optical transceiver according to claim 4, wherein:
the first and the second integral pseudo-random pattern generators/detectors input a pseudo-random pattern signal, which has been inputted, as an initial value to generate a pseudo-random pattern signal for error detection and comparison;
pseudo-random pattern detection is performed by comparing the generated pseudo-random pattern signal for error detection and comparison with the inputted pseudo-random pattern signal; and
pseudo-random pattern generation is performed by generating a pseudo-random pattern signal using a given initialization signal, or by generating the pseudo-random pattern signal by inputting the inputted pseudo-random pattern signal as an initial value.

6. An optical transceiver according to claim 1, wherein:
the input interface, the first pseudo-random pattern generator, the first pseudo-random pattern detector, and the multiplexing circuit are integrated into a multiplexing integrated circuit; and
the demultiplexing circuit, the second pseudo-random pattern generator, the second pseudo-random pattern detector, and the output interface are integrated into a demultiplexing integrated circuit.

7. An optical transceiver according to claim 1, wherein:
the input interface, the first pseudo-random pattern generator, the first pseudo-random pattern detector, the multiplexing circuit, the demultiplexing circuit, the second pseudo-random pattern generator, the second pseudo-random pattern detector, the output interface, and the first loopback path are integrated into one unit to constitute an integral multiplexing/demultiplexing integrated circuit.

8. A method for evaluating and testing an optical transceiver, said optical transceiver comprising:
a transmitting side path including:
an input interface for inputting an electric signal;
a first pseudo-random pattern generator for generating a pseudo-random pattern signal;
a first pseudo-random pattern detector for evaluating the pseudo-random pattern signal, which has been inputted through the input interface;
a multiplexing circuit for time-multiplexing the inputted electric signal;
an electricity-light converter for converting the time-multiplexed electric signal into a light signal;
a receiving side path including:
a light-electricity converter for converting an inputted light signal into an electric signal;
a demultiplexing circuit for demultiplexing the converted electric signal; and
a second pseudo-random pattern generator for generating a pseudo-random pattern signal;
a second pseudo-random pattern detector for evaluating the pseudo-random pattern signal, which has been inputted through the demultiplexing circuit; and
an output interface for outputting the demultiplexed electric signal;
a first loopback path that transmits the pseudo-random pattern signal from the multiplexing circuit of the transmitting side path to the demultiplexing circuit of the receiving side path; and
a second loopback path that transmits the pseudo-random pattern signal from the light-electricity converter of the receiving side path to the electricity-light converter of the transmitting side path;
wherein:
the optical transceiver is placed on an implementation substrate;
a loopback electric wiring is placed on the implementation substrate so that said loopback electric wiring loops back from an output electric wiring on the implementation substrate, which is connected to the output interface, to an input electric wiring on the implementation substrate, which is connected to the input interface;
an output of the electricity-light converter is connected to an outside pseudo-random pattern detecting function through a first optical fiber; and
an input of a light-electricity converter is connected to an outside pseudo-random pattern generating function through a second optical fiber.

9. A method for evaluating and testing an optical transceiver according to claim 8, wherein a light measuring instrument is used as the outside pseudo-random pattern detecting function and the outside pseudo-random pattern generating function.

10. A method for evaluating and testing an optical transceiver according to claim 8, wherein another optical transceiver, which works normally, is used as the outside pseudo-random pattern detecting function and the outside pseudo-random pattern generating function.

11. A method for evaluating and testing an optical transceiver, said optical transceiver comprising:
a transmitting side path including:
an input interface for inputting an electric signal;
a first pseudo-random pattern generator for generating a pseudo-random pattern signal;
a first pseudo-random pattern detector for evaluating the pseudo-random pattern signal, which has been inputted through the input interface;
a multiplexing circuit for time-multiplexing the inputted electric signal; and
an electricity-light converter for converting the time-multiplexed electric signal into a light signal;
a receiving side path comprising:
a light-electricity converter for converting an inputted light signal into an electric signal;
a demultiplexing circuit for demultiplexing the converted electric signal;
a second pseudo-random pattern generator for generating a pseudo-random pattern signal;
a second pseudo-random pattern detector for evaluating the pseudo-random pattern signal, which has been inputted through the demultiplexing circuit; and
an output interface for outputting the demultiplexed electric signal; and
a loopback path that transmits the pseudo-random pattern signal from the multiplexing circuit of the transmitting side path to the demultiplexing circuit of the receiving side path;
wherein:
the optical transceiver is placed on an implementation substrate;
a loopback electric wiring is placed on the implementation substrate so as to loop back from an output electric wiring on the implementation substrate, which is connected to the output interface, to an input electric wiring on the implementation substrate, which is connected to the input interface;
a loopback optical fiber, which is used for transmitting the pseudo-random pattern signal from a first optical fiber connected to an output of the electricity-light converter to a second optical fiber connected to an input of the light-electricity converter, is connected;
the input electric wiring on the implementation substrate is connected to an outside pseudo-random pattern generating function; and
the output electric wiring on the implementation substrate is connected to an outside pseudo-random pattern detecting function.

12. A method for evaluating and testing an optical transceiver according to claim 11, wherein an electric measuring instrument is used as the outside pseudo-random pattern detecting function and the outside pseudo-random pattern generating function.

13. A method for evaluating and testing an optical transceiver according to claim 11, wherein another optical transceiver, which works normally, is used as the outside pseudo-random pattern detecting function and the outside pseudo-random pattern generating function.

14. A method for evaluating and testing an optical transceiver, said optical transceiver comprising:
a transmitting side path including:
an input interface for inputting an electric signal;
a first pseudo-random pattern generator for generating a pseudo-random pattern signal;
a first pseudo-random pattern detector for evaluating the pseudo-random pattern signal, which has been inputted through the input interface;
a multiplexing circuit for time-multiplexing the inputted electric signal; and
an electricity-light converter for converting the time-multiplexed electric signal into a light signal;
a receiving side path including:
a light-electricity converter for converting an inputted light signal into an electric signal;
a demultiplexing circuit for demultiplexing the converted electric signal; and
a second pseudo-random pattern generator for generating a pseudo-random pattern signal;
a second pseudo-random pattern detector for evaluating the pseudo-random pattern signal, which has been inputted through the demultiplexing circuit; and
an output interface for outputting the demultiplexed electric signal; and
a loopback path that transmits the pseudo-random pattern signal from the multiplexing circuit of the transmitting side path to the demultiplexing circuit of the receiving side path;
wherein:
the optical transceiver is placed on an implementation substrate;
a loopback electric wiring is placed on the implementation substrate so as to loop back from an output electric wiring on the implementation substrate, which is connected to the output interface, to an input electric wiring on the implementation substrate, which is connected to the input interface; and
a loopback optical fiber, which is used for transmitting the pseudo-random pattern signal from a first optical fiber connected to an output of the electricity-light converter to a second optical fiber connected to an input of the light-electricity converter, is connected.

15. A method for evaluating and testing an optical transceiver according to claim 14, wherein:
a pseudo-random pattern generating function of a framer circuit, which generates and transmits/receives a frame pattern, is connected to the input electric wiring; and
a pseudo-random pattern detecting function of the framer circuit is connected to the output electric wiring.

16. A method for evaluating and testing an optical transceiver according to claim 15, wherein the framer circuit builds a pseudo-random pattern signal into a frame pattern to transmit the pseudo-random pattern signal.

* * * * *